(12) United States Patent
Zabovnik

(10) Patent No.: US 11,753,115 B2
(45) Date of Patent: Sep. 12, 2023

(54) DUAL PUMPING HYDROFOIL SYSTEM AND BALANCED DUAL LINEAR DRIVE PROPULSION SYSTEM AND VEHICLES AND BOATS USING SAME

(71) Applicant: Damjan Zabovnik, Watsonville, CA (US)

(72) Inventor: Damjan Zabovnik, Watsonville, CA (US)

(*) Notice: Subject to any disclaimer, the term of this patent is extended or adjusted under 35 U.S.C. 154(b) by 0 days.

(21) Appl. No.: 17/134,431

(22) Filed: Dec. 27, 2020

(65) Prior Publication Data
US 2021/0188398 A1 Jun. 24, 2021

Related U.S. Application Data

(60) Provisional application No. 62/954,394, filed on Dec. 27, 2019.

(51) Int. Cl.
*B63B 1/28* (2006.01)
*B63B 1/04* (2006.01)
*B63B 1/24* (2020.01)
*B63B 1/26* (2006.01)

(52) U.S. Cl.
CPC ............... *B63B 1/28* (2013.01); *B63B 1/04* (2013.01); *B63B 1/242* (2013.01); *B63B 1/26* (2013.01)

(58) Field of Classification Search
CPC .......... B63B 1/04; B63B 1/242; B63B 1/246; B63B 1/248; B63B 1/285; B63B 1/26; B63B 1/28; B63B 1/30; B63B 1/37
USPC ................................ 114/274, 278, 280, 282
See application file for complete search history.

(56) References Cited

U.S. PATENT DOCUMENTS

| | | | | | |
|---|---|---|---|---|---|
| 4,080,922 | A * | 3/1978 | Brubaker | ................ | B63B 1/322 114/282 |
| 4,356,786 | A * | 11/1982 | Tuggle | ...................... | B63B 1/28 114/283 |
| 7,029,340 | B2 * | 4/2006 | Smith | ..................... | B63B 1/246 440/9 |
| 7,802,534 | B2 * | 9/2010 | Chen | ...................... | B63B 1/242 114/274 |
| 8,051,793 | B2 * | 11/2011 | Ulgen | ...................... | B63B 1/30 114/274 |
| 8,720,354 | B2 * | 5/2014 | Ketterman | .............. | B63B 1/285 114/274 |
| 10,987,546 | B2 * | 4/2021 | McCord | ................. | A63B 31/11 |

* cited by examiner

*Primary Examiner* — Daniel V Venne
(74) *Attorney, Agent, or Firm* — Michael A. Guth

(57) ABSTRACT

A linear drive system adapted for repetitive driving using a linear motor. The drive system may be used to power pumping hydrofoils which drive a boat or ship. Linkages are used to maintain the driven portion in linear motion. A coupled dual drive system in which two driven portions are coupled such that their coupled motions travel at the same velocity in opposed directions. The coupled linear drive system which may be used as a mechanical power source for drive systems used in transportation and industry. A boat with dual pumping hydrofoils adapted for propel a boat using the hydrofoils for both lift and propulsion.

15 Claims, 36 Drawing Sheets

SIDE  FRONT  TOP

DUAL PUMPING HYDROFOIL SYSTEM AND BALANCED DUAL LINEAR DRIVE PROPULSION SYSTEM AND VEHICLES AND BOATS USING SAME

CROSS-REFERENCE TO RELATED APPLICATIONS

This application claims priority to U.S. Provisional Patent Application No. 62/954,394 to Zabovnik, filed Dec. 27, 2019, which is hereby incorporated by reference in its entirety. This application claims priority to U.S. Provisional Patent Application No. 63/048,656 to Zabovnik, filed Jul. 7, 2020, which is hereby incorporated by reference in its entirety.

BACKGROUND

Field of the Invention

The present invention relates to an electric linearly driven power system, and more specifically to a dual pumping hydrofoil system.

Description of Related Art

A hydrofoil usually consists of a winglike structure mounted on struts below the hull, or across the keels of a catamaran in a variety of boats. As a hydrofoil-equipped watercraft increases in speed, the hydrofoil elements below the hull develop enough lift to raise the hull out of the water, which greatly reduces hull drag. This provides a corresponding increase in speed and fuel efficiency.

SUMMARY OF THE INVENTION

A linear drive system adapted for repetitive driving using a linear motor. The drive system may be used to power pumping hydrofoils which drive a boat or ship. Linkages are used to maintain the driven portion in linear motion. A coupled dual drive system in which two driven portions are coupled such that their coupled motions travel at the same velocity in opposed directions. A linear drive system with a return spring portion which is adapted to facilitate linear direction changeover. The coupled linear drive system which may be used as a mechanical power source for drive systems used in transportation and industry.

DETAILED DESCRIPTION

Various methods of supporting powered drivetrains are used in industry, including bearings and bushings. Friction in these supporting devices, and lubrication of these supporting devices, are important aspects of drivetrain support. However, linkage based systems may be used which reduce or eliminate the need for these common support devices.

Figure 1:
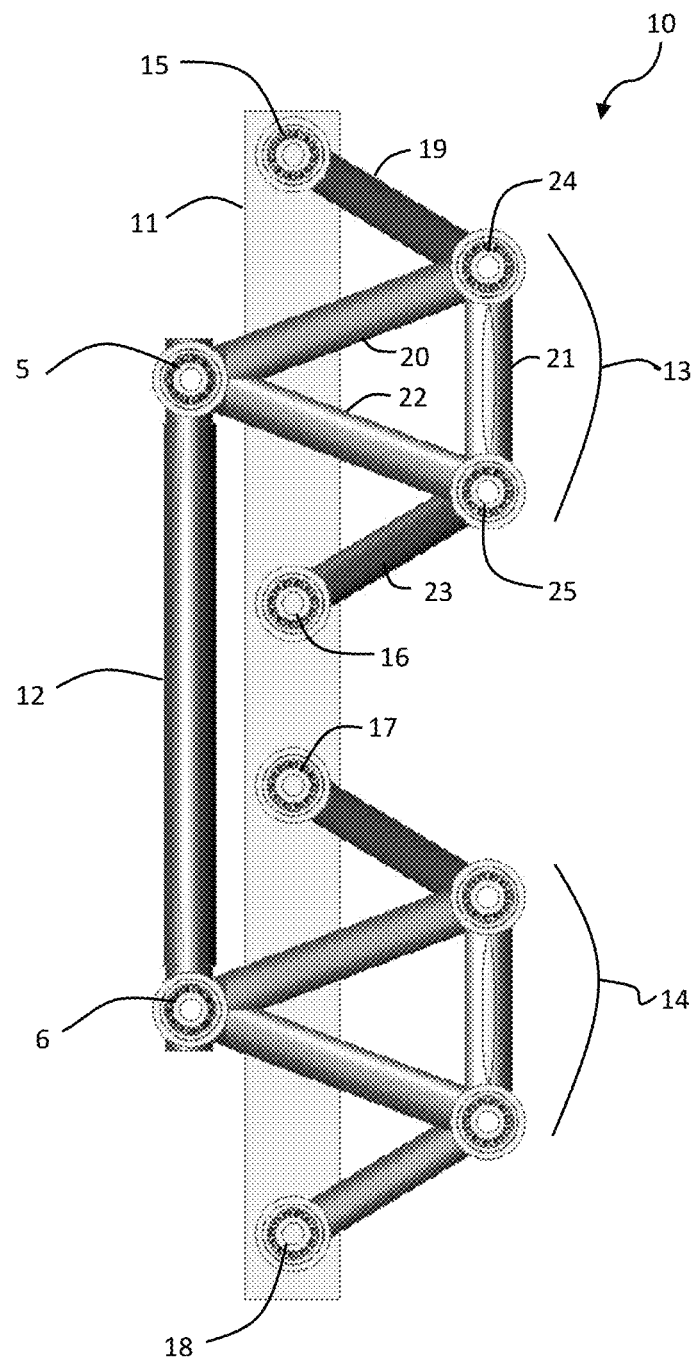
FIG. 1 is a view of a linkage based system.

In some embodiments of the present invention, as seen in FIG. 1, a linkage system 10 may include a base structure 11 which supports a first linkage subassembly 13 and a second linkage subassembly 14 whose design is adapted for allowing the linear motion of a drive rod 12. The linearity of the motion of such a drive rod is discussed further below. The first linkage subassembly 13 consists of two base links 19, 23 pivotally coupled to the base structure 11 at their first ends with bearings 15, 16. A joining link 21 is pivotally coupled to the second end of the base links 19, 23 with bearings 24, 25. The rod links 20, 22 are also pivotally coupled to the second ends of the base links 19, 23 and then are pivotally coupled together at a first end of the drive rod 12 with a bearing 5. The second linkage subassembly 14 is similarly constructed and pivotally coupled to a second end of the drive rod 12 with a bearing 6. With such a construction, the drive rod will travel along a linear path (vertically in the view of FIG. 1) through a central drive range.

Figure 2A:
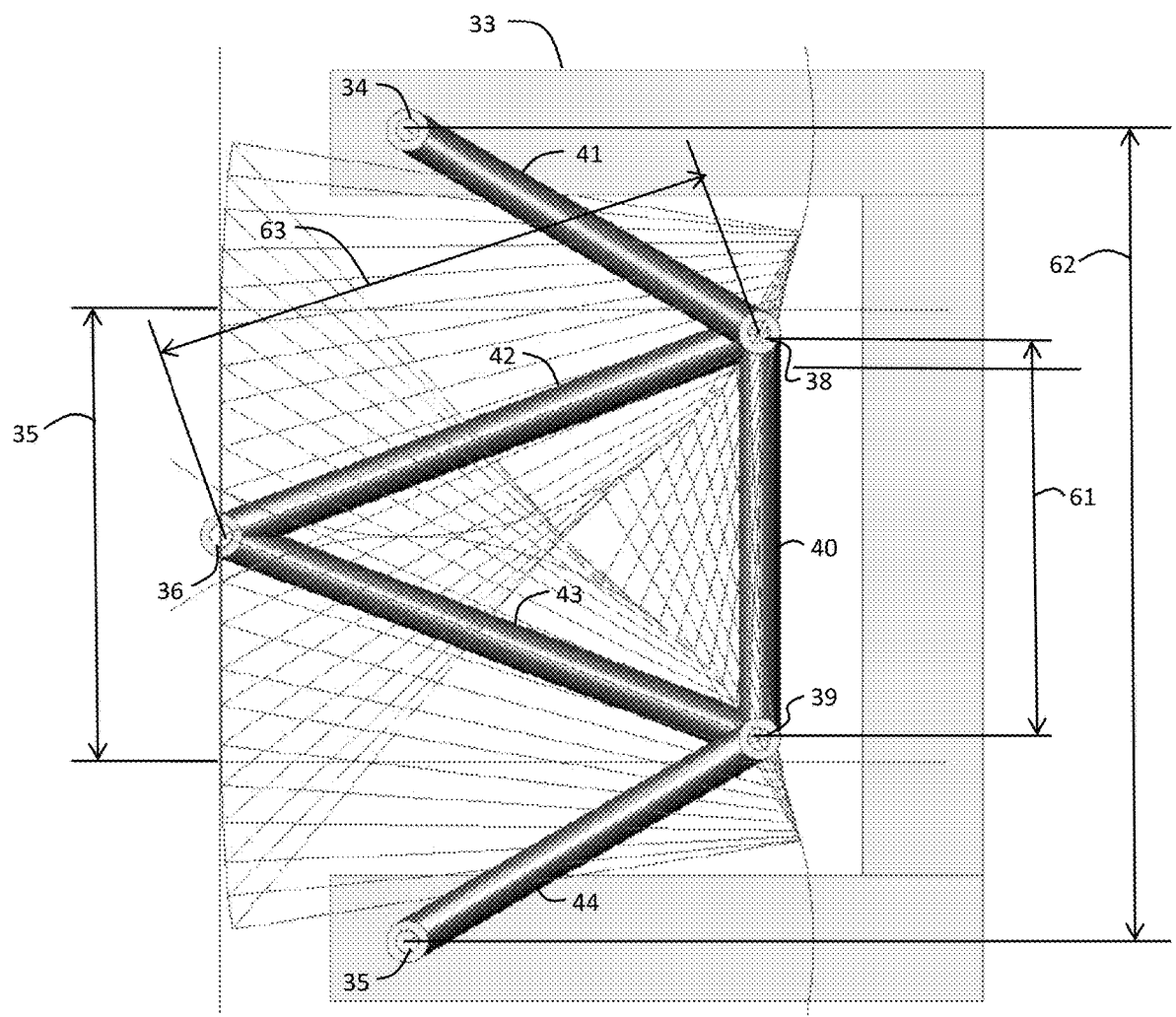
FIGS. 2A-C illustrate positions of a linkage based system.
Figure 2B:
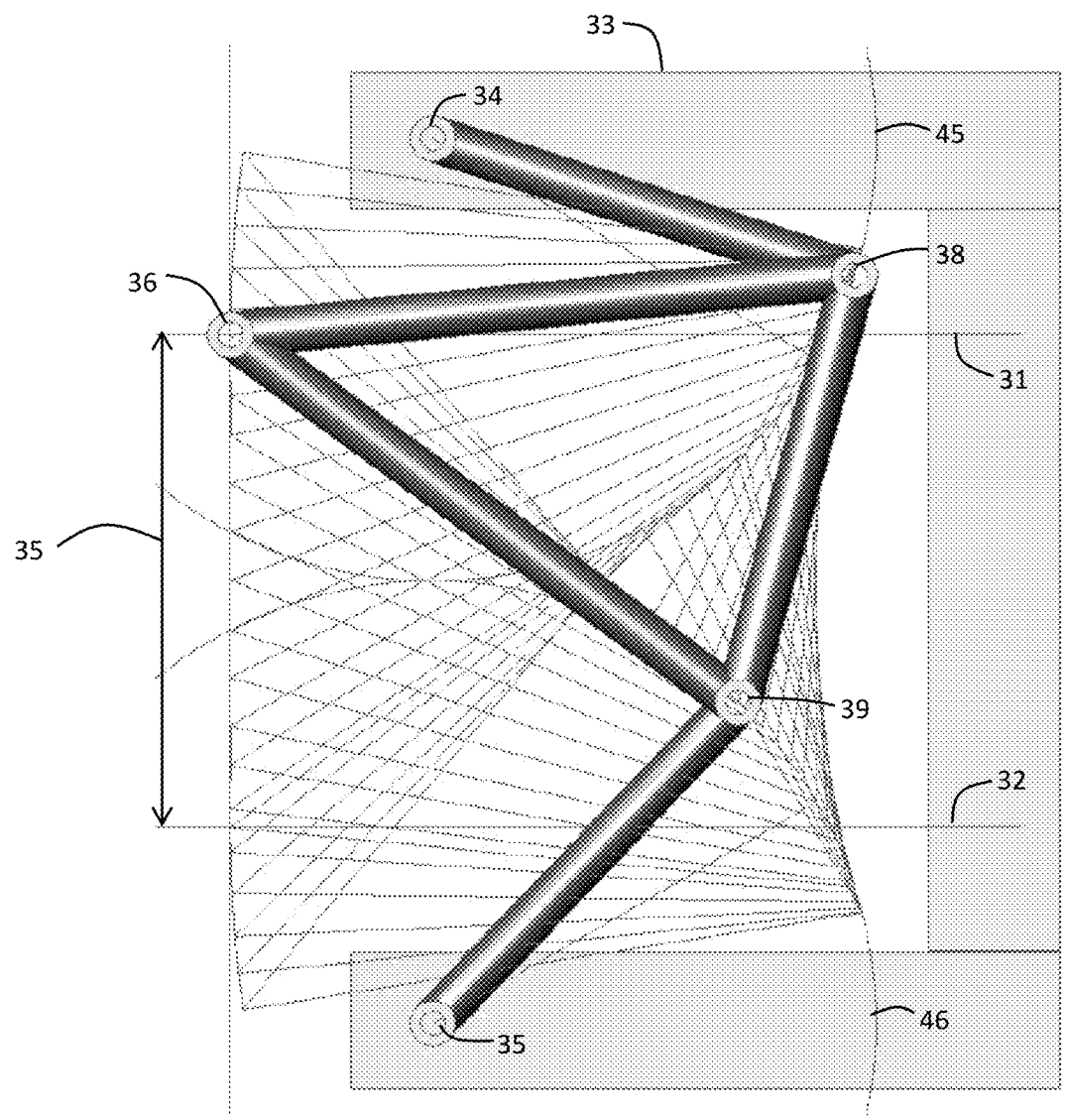
Figure 2C:
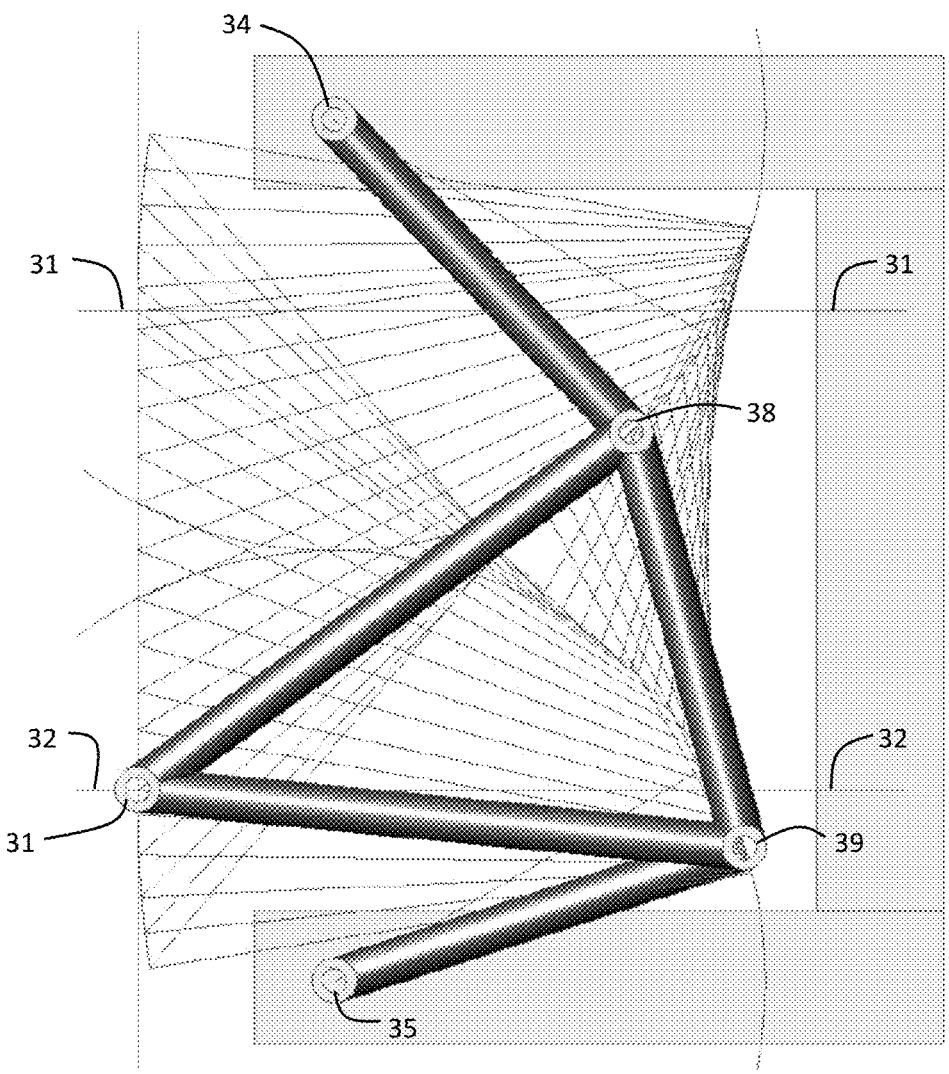

FIGS. 2A, 2B, and 2C are views of the center, top, and bottom of the linear travel path 35 of the drive link attachment 36 of a linkage subassembly. In this illustrative embodiment, and as seen in FIG. 2A, the linkage subassembly consists of two base links 41, 44 which are of the same length and are pivotally coupled to the base structure 33 at their first ends with base bearings 34, 35. A joining link 40 is pivotally coupled to the second end of the base links 41, 44 with bearings 38, 39. The rod links 42, 43 are of the same length and are also pivotally coupled to the second ends of the base links 41, 44 and then are pivotally coupled together with a drive link bearing 36. As the drive link bearing 36 moves 37 in concert with the various pivoting actions in the linkage subassembly, there will be a motion range 35, or drive range, in which the drive link bearing 36 will move in a nearly perfectly straight line. The bearings 38, 39 of the second end of the base links 41, 44 will follow a curvilinear path 45, 46. In this illustrative embodiment, the spacing 62 between the base bearings 34, 35 is a distance that is twice the length 61 of the joining link 40, and the length 63 of the rod links is the length 61 of the joining link multiplied the square root of 2 (multiplied by approx. 1.414). The linear range, or drive range, 35 of the drive link bearing 36 will be in excess of 1.1 times the length of the joining link 40. FIG. 2B illustrates the linkage subassembly with the drive link bearing 36 at the top 31 of the linear range 35. FIG. 2C illustrates the linkage subassembly with the drive link bearing 36 at the bottom 32 of the linear range 35.

Figure 3:
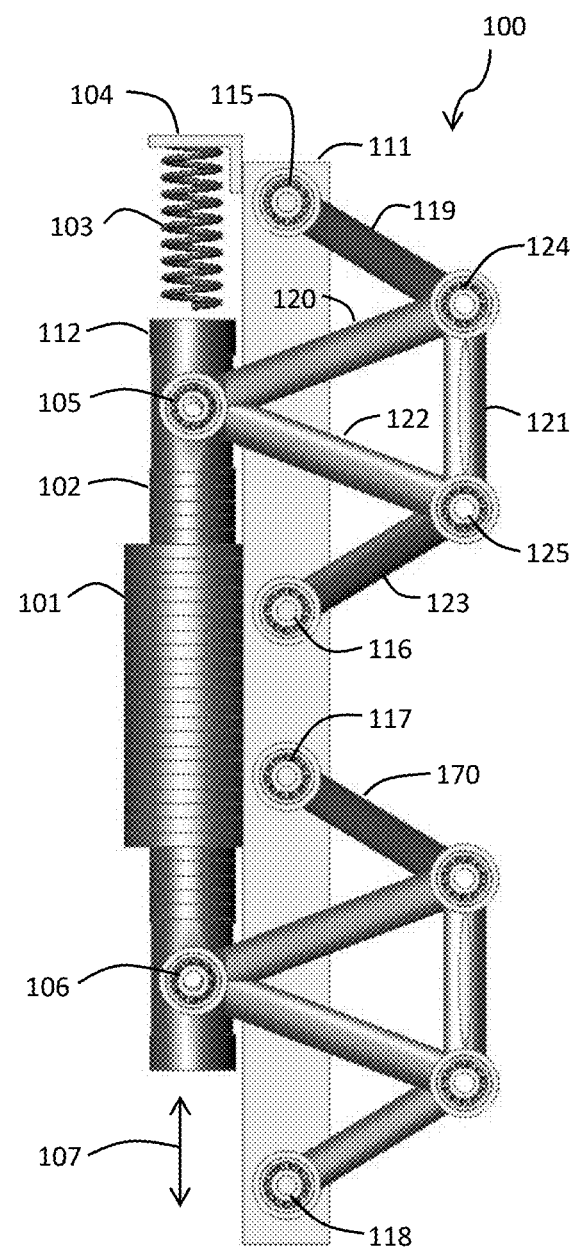
FIG. 3 is a view of a linearly driven linkage based system according to some embodiments of the present invention.

FIG. 3 illustrate a single linear drive system 100 according to some embodiments of the present invention. In this illustrative embodiment a first linkage subassembly consists of two base links 119, 123 which are of the same length and are pivotally coupled to the base structure 111 at their first ends with base bearings 115, 116. A joining link 121 is pivotally coupled to the second end of the base links 119, 123 with bearings 124, 125. The rod links 120, 122 are of the same length and are also pivotally coupled to the second ends of the base links 119, 123 and then are pivotally coupled together and to a first end of the drive rod 112 with a drive link bearing 105. Similarly, a second linkage subassembly is pivotally coupled to the second end of the drive rod 112 with a bearing 106, and to the base structure 111. The base bearings 115, 116, 117, 118 are in linear relationship.

The drive rod 102 is adapted to be driven by the outer linear drive motor portion 101. The outer linear drive motor portion 101 is fixedly coupled to the base structure 111 and may have an internal cylindrical surface through which the drive rod may be driven, and through which the drive rod may travel. In some aspects, the outer drive portion has a plurality of windings along its linear length. In some aspects, the drive rod has a plurality of magnets and iron rings along its length. The windings of the outer drive portion may be electrically coupled to a power drive system adapted to energize the windings as appropriate to accelerate or drive the drive rod, with its magnets and iron rings, along the drive axis of the linear drive system. As the drive rod 112 moves 107 (vertically as shown in FIG. 3) it travels through a linear path due to its coupling to the linkage subassemblies, as discussed above. Using the linkages which guide the drive rod along a linear path through its central drive range, the drive rod may travel through the outer linear drive motor portion without the need for bearings or bushings between the outer motor portion and the drive rod. The drive rod 112 may have an inner linear drive motor portion 102 adapted to interact with the outer linear drive motor portion 101. The outer linear drive motor portion 101 may have electric coils which are coupled to an electric power source adapted to provide pulsating DC current. The drive rod 112 may have ring magnets and iron rings. In an exemplary functionality, the drive rod 112 may be driven downward in a power stroke, which may transfer mechanical power to a drive system. As the drive rod 112 is driven by the linear drive motor it travels through a linear path due to its coupling to the linkage subassemblies. A spring 103 may be coupled to a spring bracket 104 which is in turn coupled to the base structure 111. As it reaches the extent of its power stroke, the spring 103 has worked to slow and stop the drive rod from over extension. The linear motor may then be driven in reverse and the drive rod is helped in its acceleration by the spring force. Similarly, as the drive rod reaches the extent of its reverse stroke, the spring 103 acts in similar fashion at the reverse end as well. In some aspects, the spring begins its retardation of the stroke in the final third of the central drive range. In some aspects, the spring begins its retardation of the stroke in the final fourth of the drive range. In some aspects, the retardation can begin as the drive rod leaves its centered position.

Figure 4:
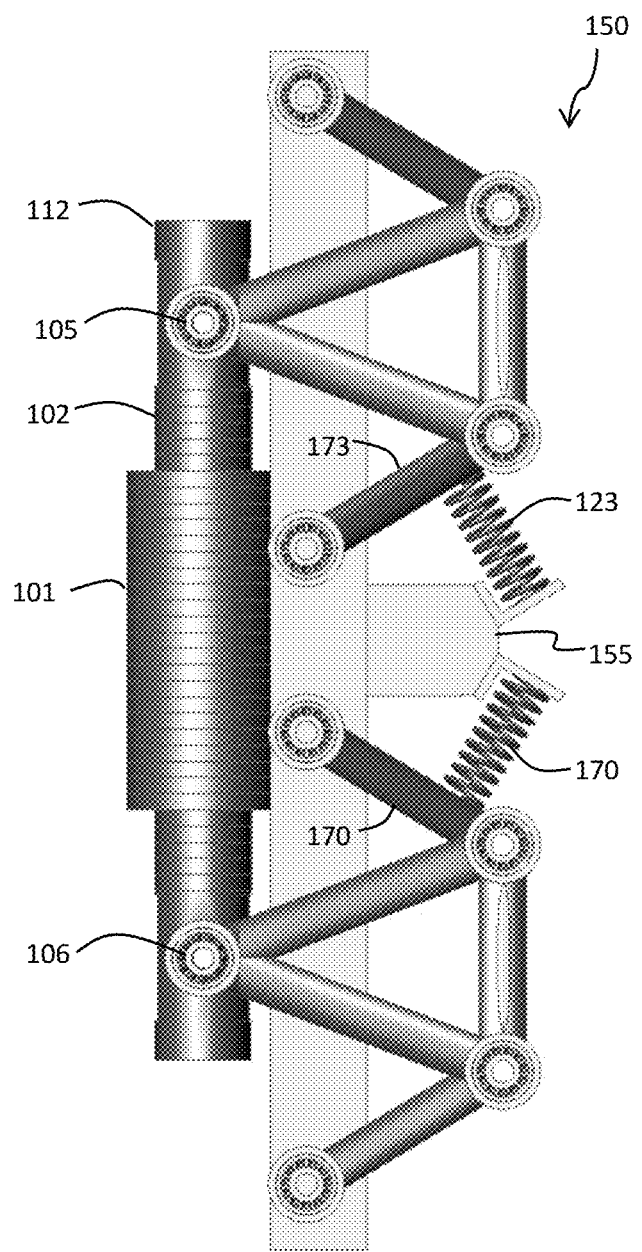
FIG. 4 is a view of a linearly driven linkage based system with springs according to some embodiments of the present invention.

FIG. 4 illustrates a second embodiment 150 of a single linear drive system 150 according to some embodiments of the present invention. A spring bracket 155 supports a first spring 123 and a second spring 170. The spring bracket 155 is coupled to the base structure 111. The first spring 123 is coupled to a first base link 173 and the second spring 179 is coupled to a second base link 170. The springs work to help slow, stop, and reverse the drive rod 112 as it changes drive directions. The springs also add efficiency by converting kinetic energy into potential spring then using the potential energy assist the reversal of motion. Using the linkages which guide the drive rod along a linear path through its central drive range, the drive rod may travel through the outer linear drive motor portion without the need for bearings or bushings between the outer motor portion and the drive rod.

Figure 5:
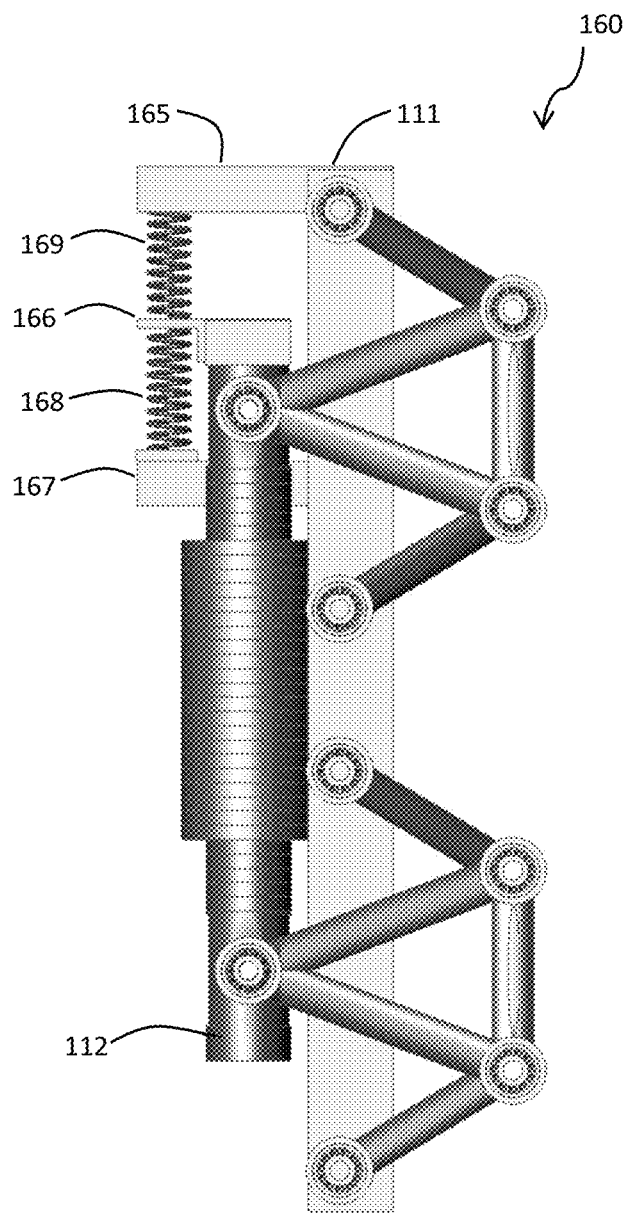
FIG. 5 is a view of a linearly driven linkage based system with springs according to some embodiments of the present invention.

FIG. 5 illustrates a third embodiment 160 of a single linear drive system 150 according to some embodiments of the present invention. Spring brackets 16, 166, 167 support a first spring 169 and a second spring 168. The intermediate spring bracket 166 is coupled to the drive rod 112, and the first and third spring brackets 165, 167 are coupled to the base structure 111. The springs work to help slow, stop, and reverse the drive rod 112 as it changes drive directions. Using the linkages which guide the drive rod along a linear path through its central drive range, the drive rod may travel through the outer linear drive motor portion without the need for bearings or bushings between the outer motor portion and the drive rod.

Figure 6:
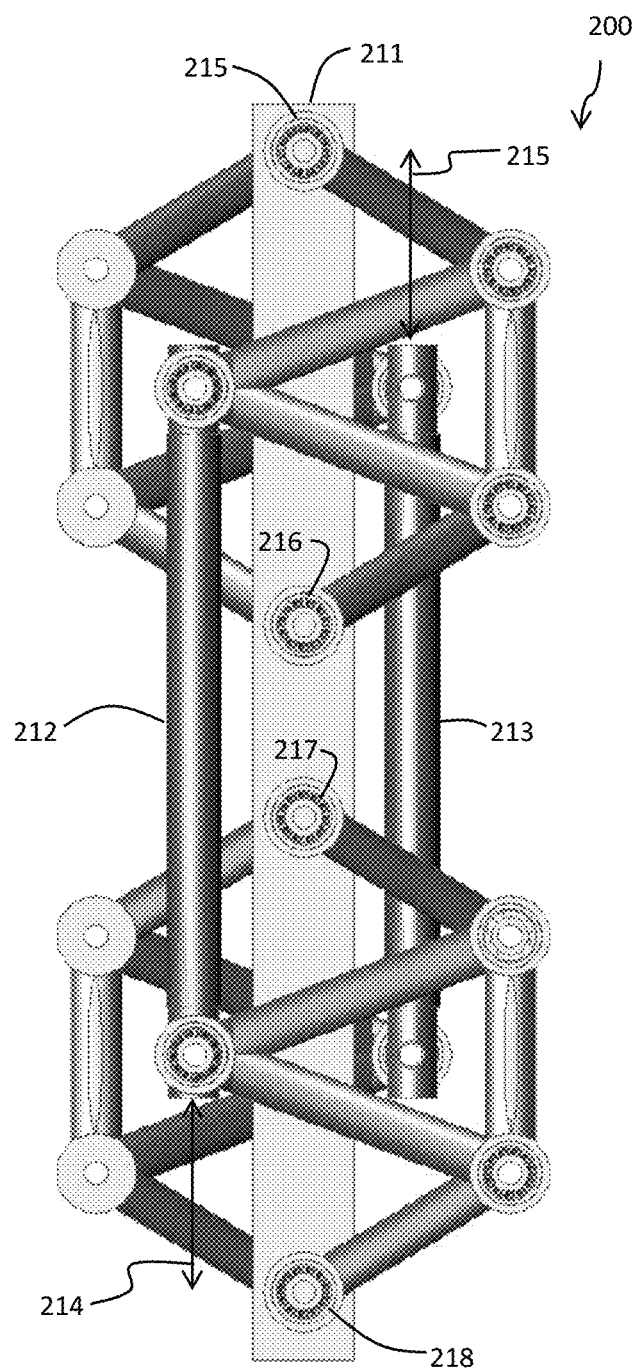
FIG. 6 is a view of a linearly driven linkage based dual system according to some embodiments of the present invention.
Figure 7:
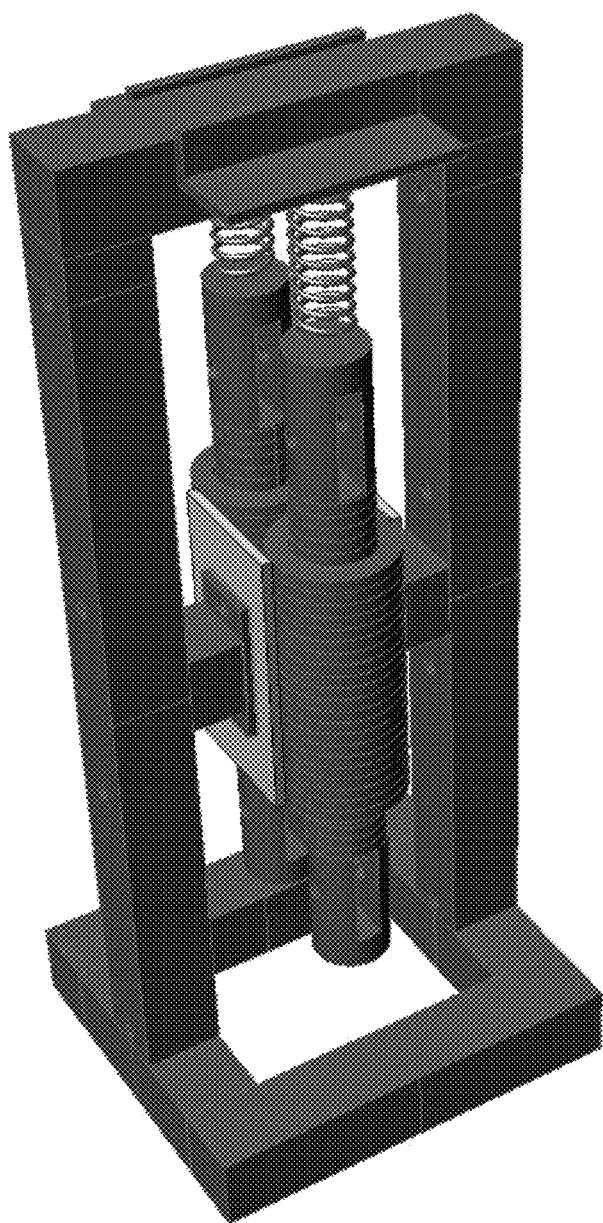
FIG. 7 is a partial view of a linearly driven system with springs according to some embodiments of the present invention.

In some embodiments of the present invention, as seen in FIG. 6, a dual linear drive system 200 couples two linear drive systems to a single base structure 211. The first drive rod 212 moves along a first linear path 214 and the second drive rod 213 moves along a second linear path 215. The first linear drive system and the second linear drive system share coupling points 215, 216, 217, 218 on the base structure 211. The compact configuration of the dual linear drive system allows for two drive rods in close proximity. The drive rods 212, 213 may be further coupled to apparatus for motive transport, or for other uses. Although not illustrated in this view of FIG. 6, the drive rods 212, 213, may each have linear drive motors as discussed above. In this illustrative embodiment, a very compact configuration is achieved. In this illustrative embodiment, although the first linear drive system and the second drive system share coupling position to a single base structure, they nevertheless are free to operate independently. FIG. 7 illustrates a base structure with a first and second linear motor assembly affixed thereto. The motor external drive portions are fixedly coupled to the base structure. The motor drive rods are able to travel along their drive axes. The linkage assemblies are omitted in FIG. 7 for clarity.

Figure 8:
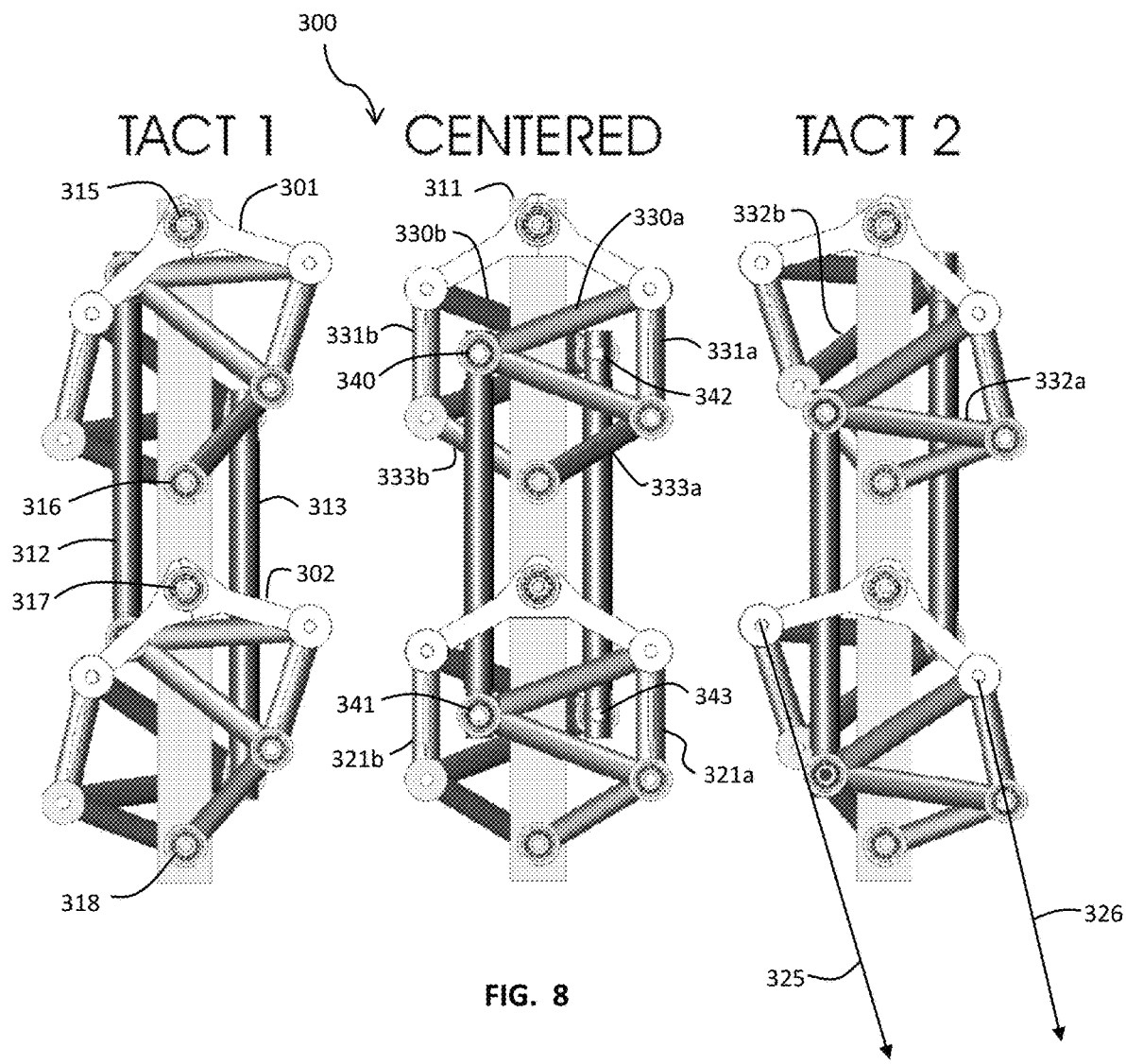
FIG. 8 is a view of a linearly driven linkage based dual system according to some embodiments of the present invention.

In some embodiments of the present invention, as seen in FIG. 8, a linked dual linear drive system 300 couples the motion of the first linear drive system to the second linear drive system. A first linkage subassembly of the first linear drive system consists of a base link 333a which is pivotally coupled to the base structure 311 at a first end with a base bearing 316. A joining link 331a is pivotally coupled to the second end of the base link. The rod links 330a, 332a are of the same length and are also pivotally coupled to the second ends of the base links and then are pivotally coupled together and to a first end of the drive rod 312 with a drive link bearing 340. The other base link 301, however, is a coupled base link which couples the motion of the first linear drive system to the second linear drive system. This connection base link 301, and the second connection base link 302, couple the up motion of one drive rod to the down motion of the other drive rod.

A first linkage subassembly of the second linear drive system consists of a base link 333b which is pivotally coupled to the base structure 311 at a first end with a base bearing 316. A joining link 331b is pivotally coupled to the second end of the base link. The rod links 330b, 332b are of the same length and are also pivotally coupled to the second ends of the base links and then are pivotally coupled together and to a first end of the drive rod 313 with a drive link bearing 342. The other base link 301, however, is a coupled base link which couples the motion of the second linear drive system to the first linear drive system Similarly, a second linkage subassembly of the first linear drive system is pivotally coupled to the second end of the drive rod 312 with a bearing 341, and to the base structure 311. The base bearings 315, 316, 317, 318 are in linear relationship. A joining link 321a is pivotally coupled to the second end of a base link. A joining link 302 couples the second linkage subassembly of the first linear drive system to the second linkage subassembly of the second linear drive system. The second linkage subassembly of the second linear drive system has a coupled joining link 321b that is similarly coupled to the second linkage subassembly of the first linear drive system.

FIG. 7 illustrates a dual linear drive system shown without the supporting linkages. The outer linear motor drive portions are seen fixedly coupled to the base structure, while the drive rods which have inner linear motor drive portions are able to drive within the outer linear motor drive portions.

In the exemplary embodiment of FIG. 8, a very compact linked dual drive system 300 allows for linked driving of a power system when configured with linear drive motors as described above. FIG. 8 illustrates the range motion of the system as the drive rods 312, 313 move up and down, as they would under powered driving. In this configuration, although the joining links 331a, 331b, 321a, 321b are parallel in the mid-range centered position, as the range is extended the attitudinal positions 325, 326 of the adjacent joining links of the first and second linkage subassemblies are not parallel, although close to parallel. Using the linkages which guide the drive rod along a linear path through its central drive range, the drive rod may travel through the outer linear drive motor portion without the need for bearings or bushings between the outer motor portion and the drive rod.

Although the drive rods 312, 313 are shown in FIG. 8 as simple rods, they are illustrative of motor drive rods as discussed above. In some aspects, the linked dual drive system of FIG. 8 would further have motor external drive portions around each of the drive rods. The drive rods may have a plurality of magnets and iron rings, and the motor external drive portions may have a plurality of windings which are coupled to drive electronics. In some aspects, the drive rods may extend past the one or more of the drive link bearings 340, 341, 342, 343 such that the drive rods may power an external device or mechanism.

Figure 9:
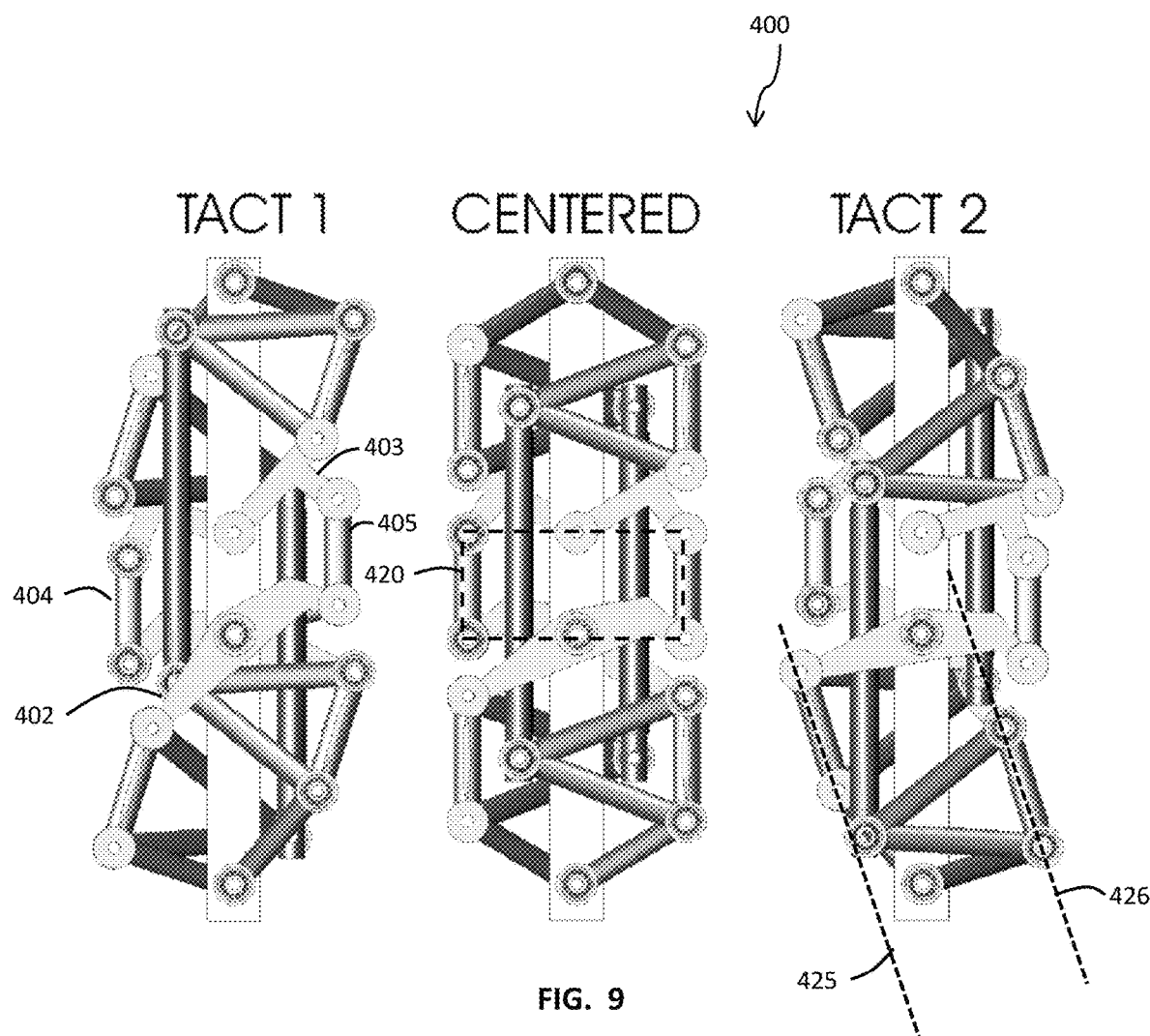
FIG. 9 is a view of a linearly driven linkage based dual system according to some embodiments of the present invention.

In some embodiments of the present invention, as seen in FIG. 9, an optimized linked dual linear drive system 400 couples the motion of the first linear drive system to the second linear drive system in a manner which keeps the position and speeds of the first and second linear drive systems equal and opposite. In this dual linear drive system, the first linear drive system and the second drive systems are coupled using a first middle link 404 and a second middle link 405. The middle links are coupled to an upper system joining piece 403 and a lower system joining piece 402. The six pivots associated with the rectangle 420 formed by the base structure pivots of the upper and lower system joining pieces 402, 403 and the top and bottom pivots of the middle links 404, 405 are in line and as shown. In this system, the motions of the drive rods are coordinated and they will travel at the same speed, but in the opposite directions. Also, the attitudes 425, 426 of the joining links are parallel at all positions.

Figure 10:
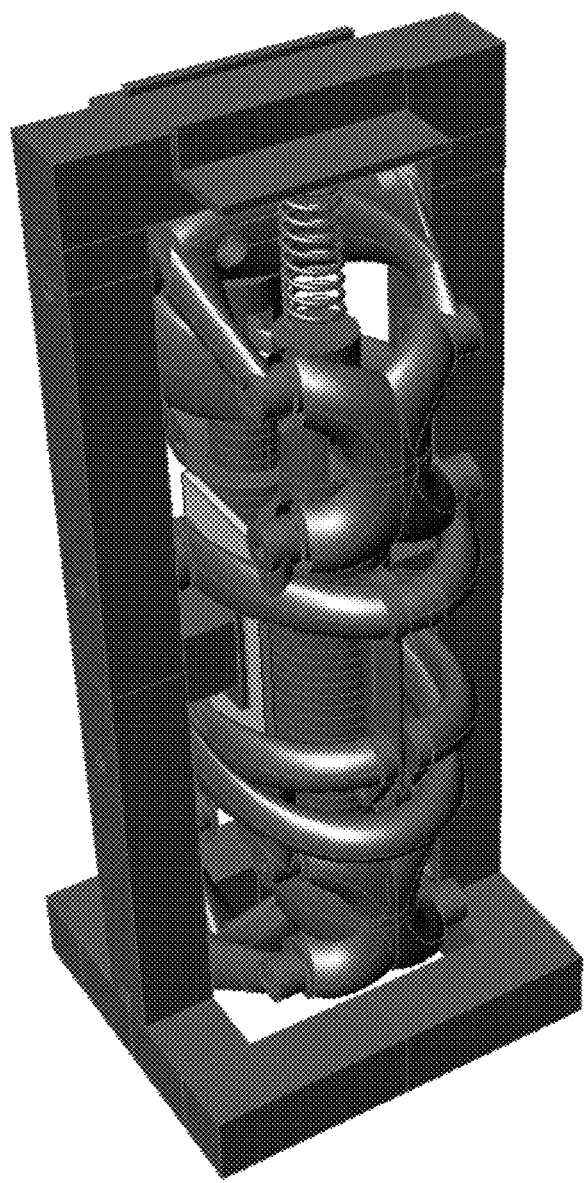
FIG. 10 is a view of a linearly driven linkage based dual system according to some embodiments of the present invention.
Figure 11:
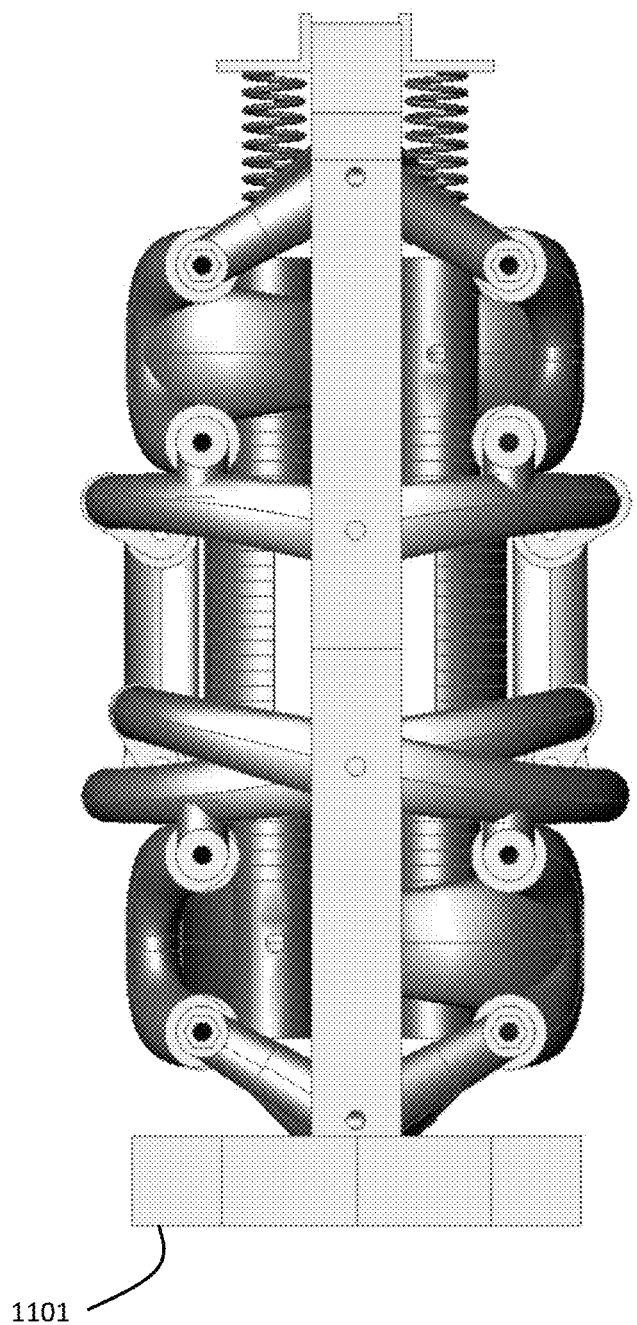
FIG. 11 is a view of a linearly driven linkage based dual system according to some embodiments of the present invention.

FIGS. 10-13 illustrate embodiments of very compact linked dual drive systems according to some embodiments of the present invention. FIGS. 10 and 11 illustrate the system with its main base structure 1101, which can be seen as the square-tubes structure residing outside of the linkages.

Figure 12:
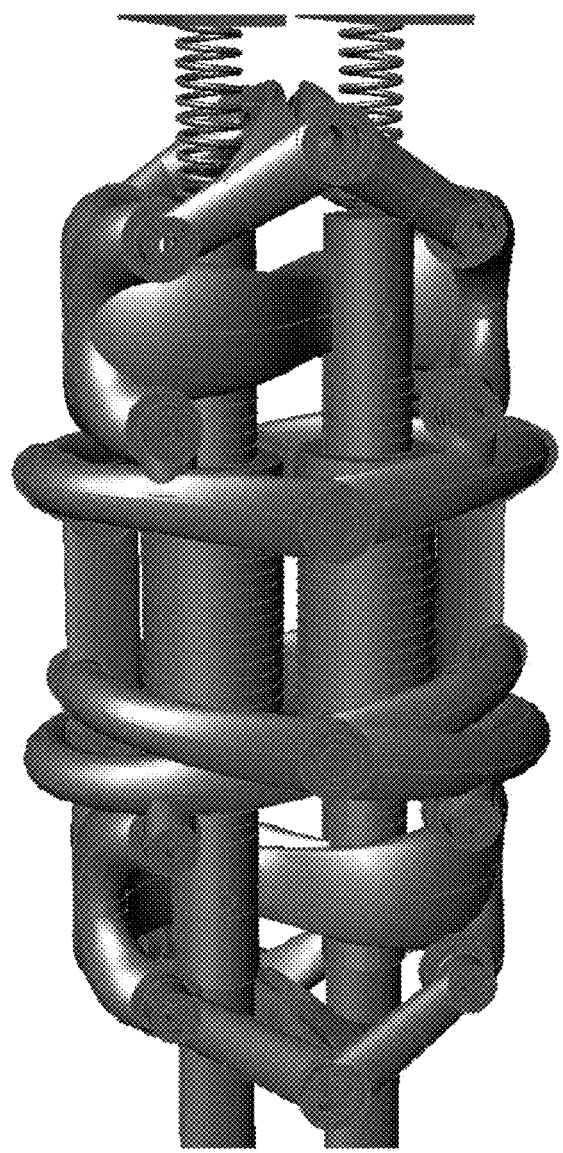
FIG. 12 is a partial view of a linearly driven linkage based dual system according to some embodiments of the present invention.
Figure 13:
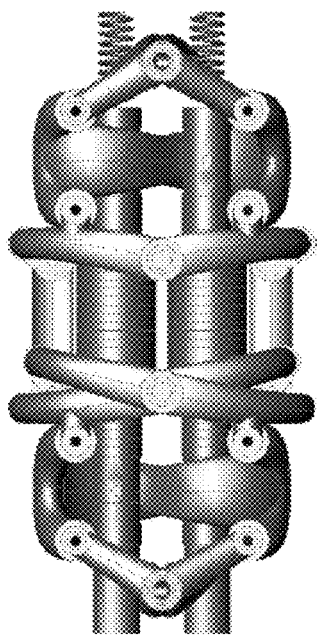
FIG. 13 are views of a linearly driven linkage based dual system according to some embodiments of the present invention.
Figure 13:
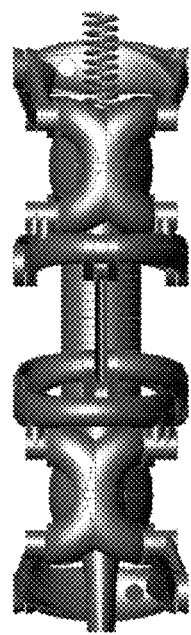
Figure 13:
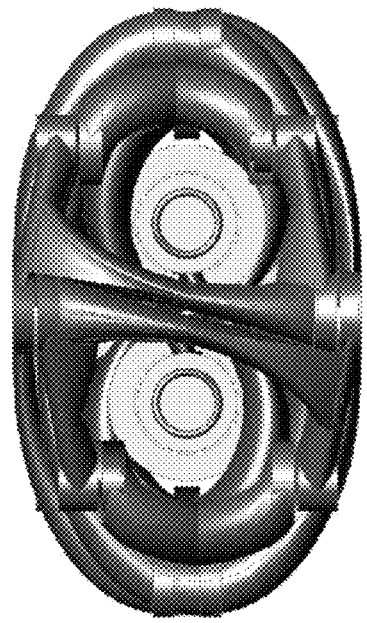

FIGS. 12 and 13 illustrate the system with the main base structure omitted for clarity, allowing for observation of the very complex linkage structure. In these exemplary views, the linkages are designed to occupy a very significant majority of the internal space while providing clearance for the moving linkage pieces and the drive rods. These large linkages can then take very large loads and provide significant stiffness.

Figure 14:
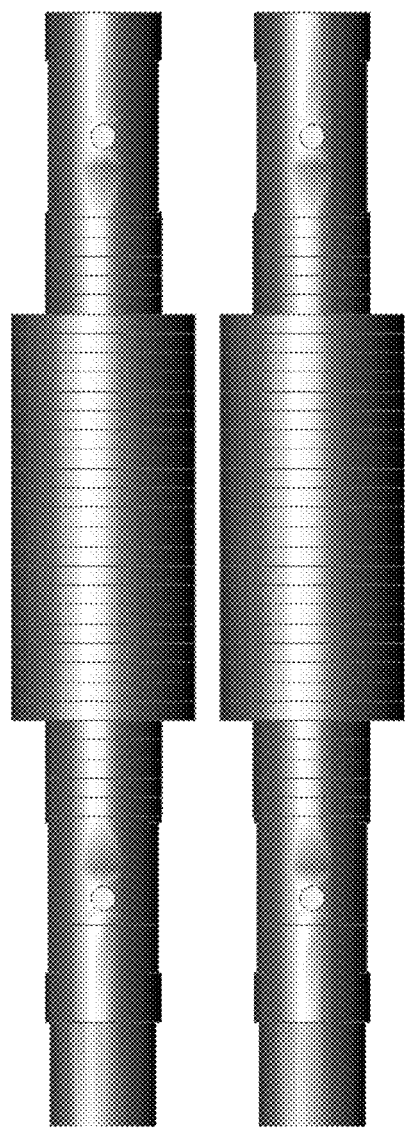
FIG. 14 a view of dual linear drives according to some embodiments of the present invention.
Figure 15:
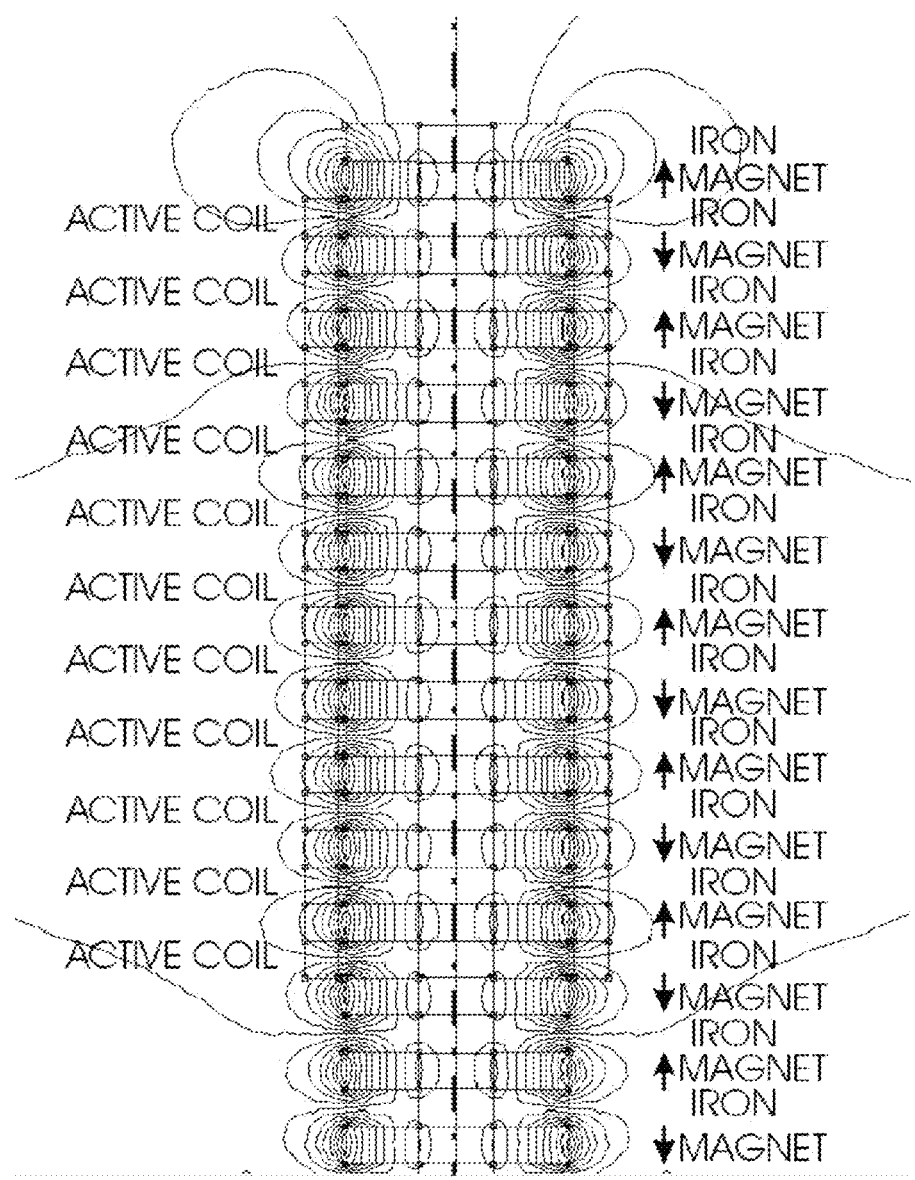
FIG. 15 a view of a drive system according to some embodiments of the present invention.
Figure 16:
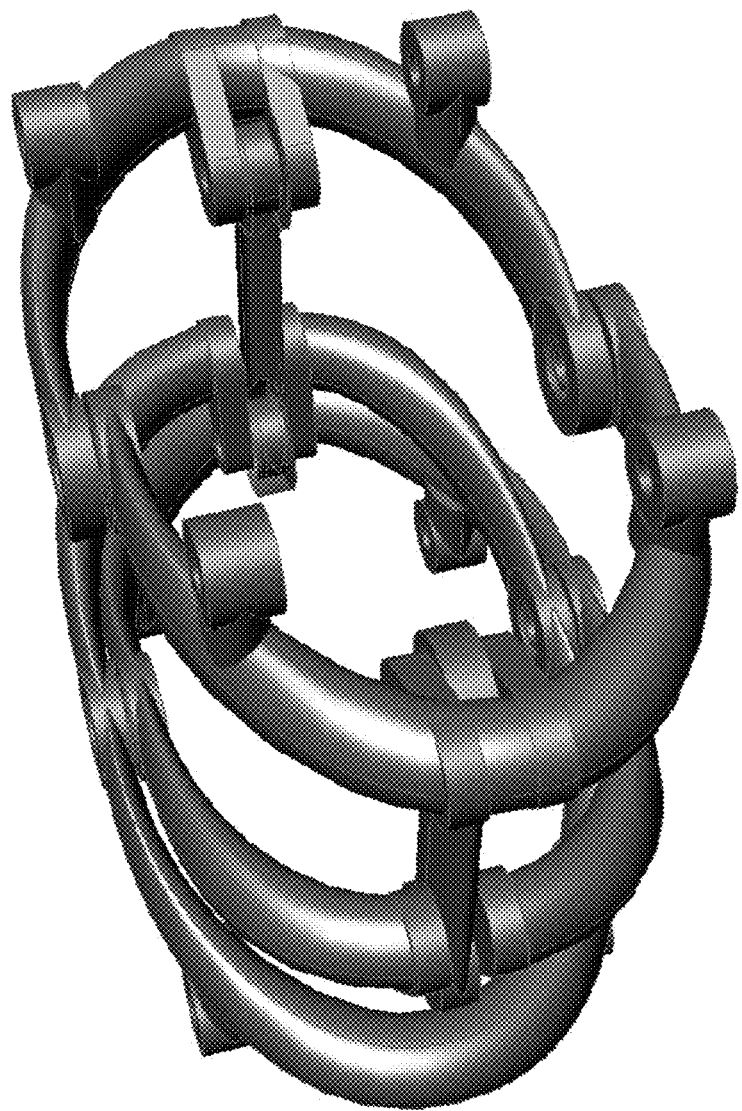
FIG. 16 is a view of linkage components according to some embodiments of the present invention.
Figure 17:
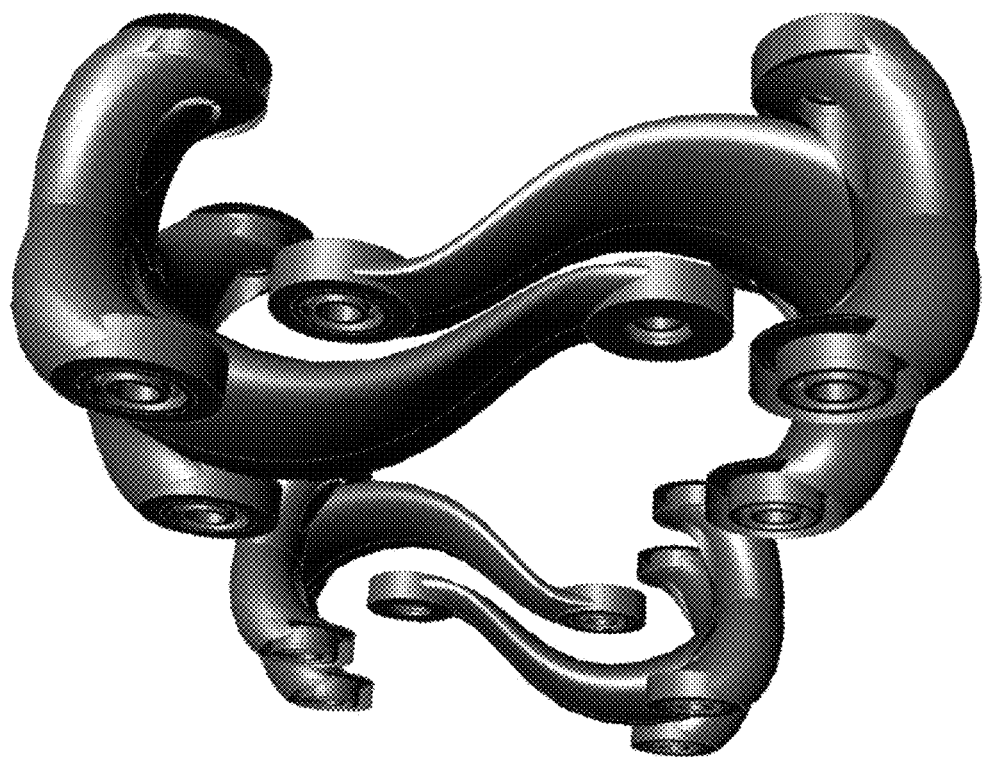
FIG. 17 is a view of linkage components according to some embodiments of the present invention.
Figure 18:
FIG. 18 is a view of linkage components according to some embodiments of the present invention.
Figure 19A:
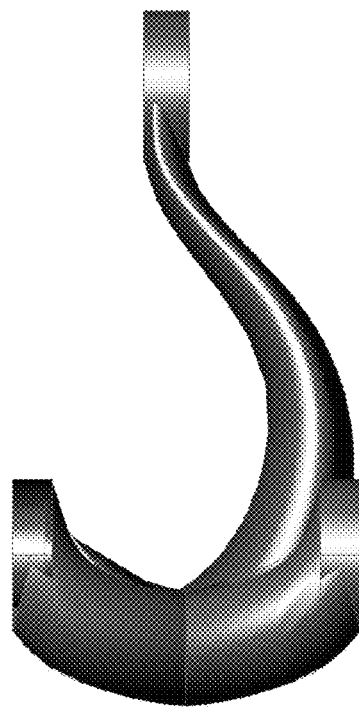
FIG. 19A-B are views of linkage components according to some embodiments of the present invention.
Figure 19B:
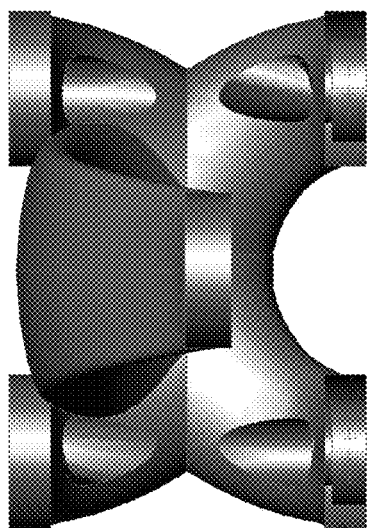
Figure 20:
FIG. 20 is a view of linkage components according to some embodiments of the present invention.

FIGS. 14 and 15 illustrate aspects of the linear drive motor according to some embodiments of the present invention. In the illustrative view of FIG. 14, the drive rods, which may have a plurality of magnets along their length, are adapted to travel within the exterior motor portion, which may have a plurality of windings. In some aspects, the drive rods extend in order to provide drive power to a device or mechanism. In the illustrative view of FIG. 15, the active coils reside within the motor external drive portion, which is fixedly coupled to a base support structure. The drive rod may have a plurality of magnets, which may be alternating magnets, with iron rings in between them, such that electrical impulses sent to the windings in sequence result in the motion of the drive rod along the drive axis. In some aspects, coils of the first and second stators can be connected to the same controller, as the desired motions and speeds are equal and opposite. The coils of the first and second stators would be coupled in reverse order vertically.

FIGS. 16-20 illustrate components of the very compact linked dual drive systems according to some embodiments of the present invention. The various components may be combined to form the very compact linked dual drive system of FIGS. 10-13.

Figure 21:
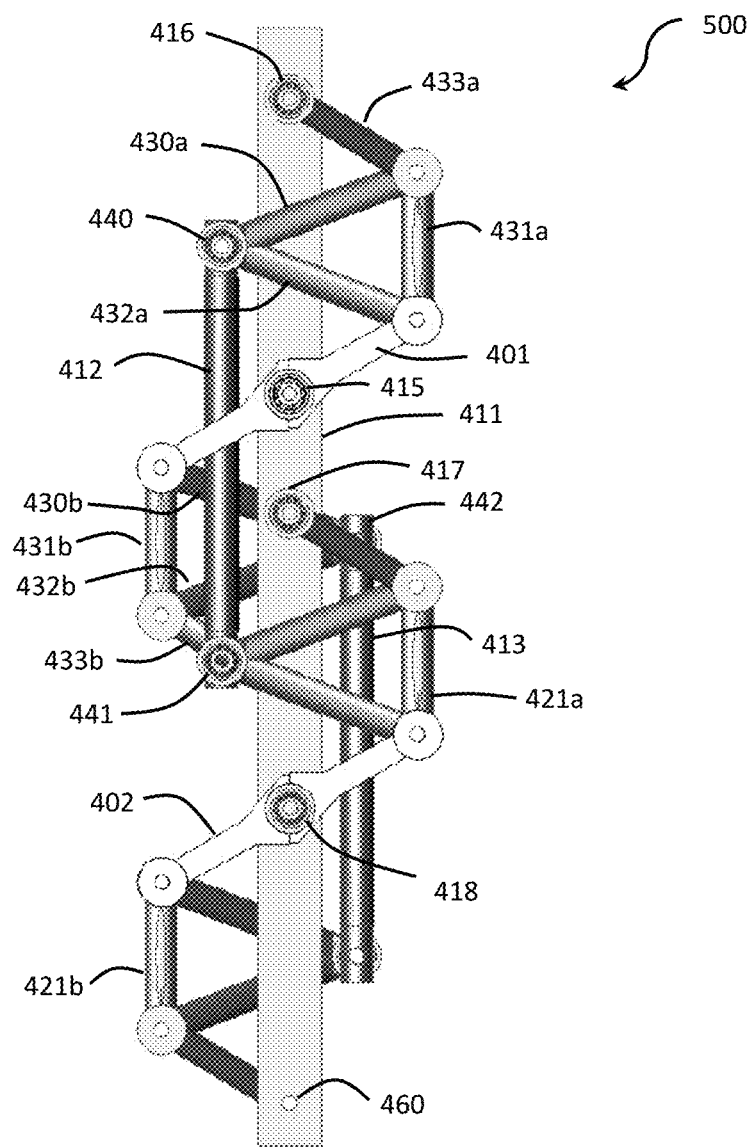
FIG. 21 is a view of a linearly driven linkage based dual system according to some embodiments of the present invention.
Figure 22:
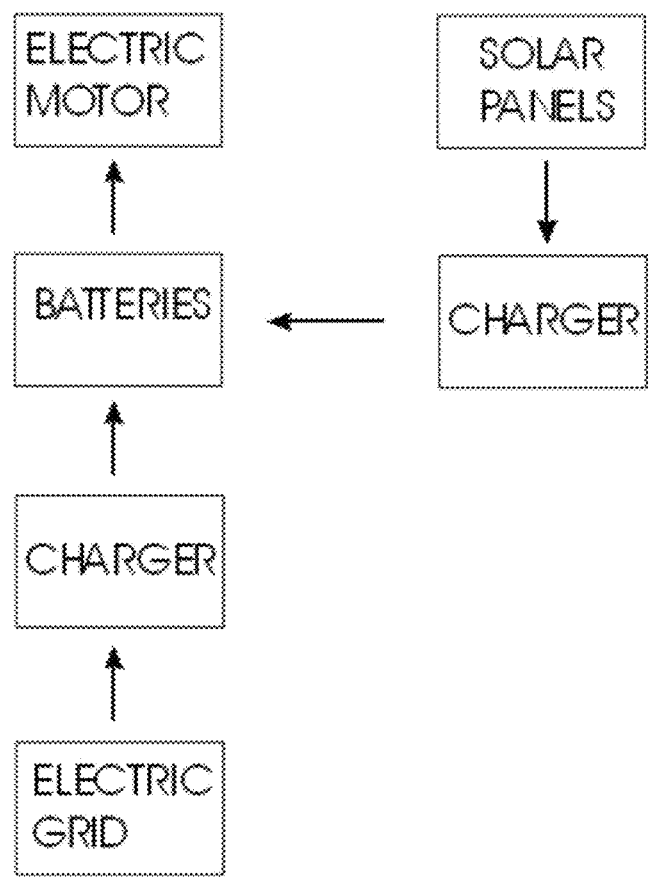
FIG. 22 is a block diagram of a drive system according to some embodiments of the present invention.
Figure 23:
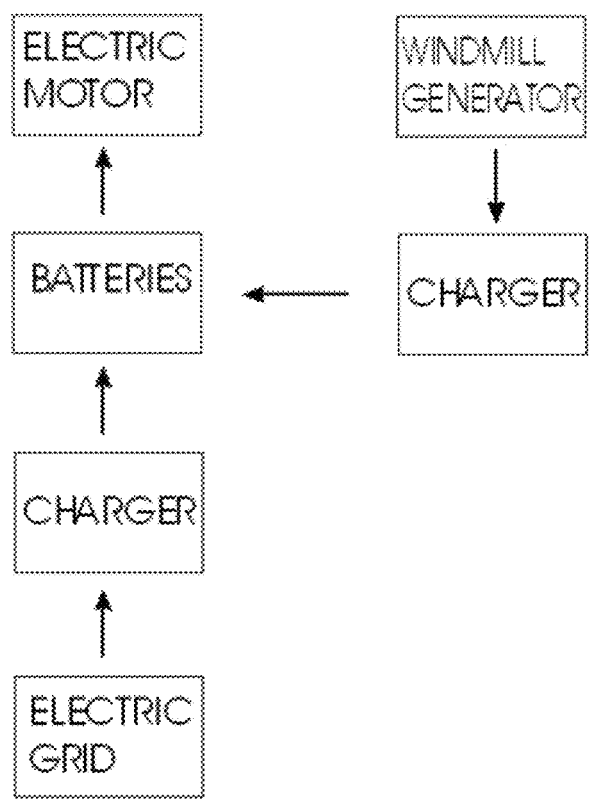
FIG. 23 is a block diagram of a drive system according to some embodiments of the present invention.

In some embodiments of the present invention, as seen in FIG. 21, a linked dual linear drive system 500 couples the motion of the first linear drive system to the second linear drive system in an extended fashion. A first linkage subassembly of the first linear drive system consists of a base link 433a which is pivotally coupled to the base structure 411 at a first end with a base bearing 416. A joining link 431a is pivotally coupled to the second end of the base link. The rod links 430a, 432a are of the same length and are also pivotally coupled to the second ends of the base links and then are pivotally coupled together and to a first end of the drive rod 412 with a drive link bearing 440. The other base link 401, however, is a coupled base link which couples the motion of the first linear drive system to the second linear drive system.

A first linkage subassembly of the second linear drive system consists of a base link 433b which is pivotally coupled to the base structure 411 at a first end with a base bearing. A joining link 431b is pivotally coupled to the second end of the base link. The rod links 430b, 432b are of the same length and are also pivotally coupled to the second ends of the base links and then are pivotally coupled together and to a first end of the drive rod 413 with a drive link bearing 442. The other base link 401, however, is a coupled base link which couples the motion of the second linear drive system to the first linear drive system Similarly, a second linkage subassembly of the first linear drive system is pivotally coupled to the second end of the drive rod 412 with a bearing 441, and to the base structure 411. The base bearings 415, 416, 417, 418, 460 are in linear relationship. A joining link 421a is pivotally coupled to the second end of a base link. A joining link 402 couples the second linkage subassembly of the first linear drive system to the second linkage subassembly of the second linear drive system. The second linkage subassembly of the second linear drive system has a coupled joining link.

In some aspects, the linear drive systems as described above may be used to drive pumping hydrofoils adapted for propulsion of a boat. In some aspects, the pumping hydrofoils as described herein may be driven by an alternate drive system.

Foiling refers to the use of hydrofoils attached to the hull of fast boats, which provides additional lift at planning speeds—often enough to lift the hull completely clear of the water. Lifting the boat clear of the surface can reduce the disturbance of waves, smoothing the ride, but only up to a point. It's not just about lift though—active foils can also be used to improve stability or handling and in some circumstances, can improve efficiency even without lifting the boat. Foils work in a similar way to aircraft wings. In simple terms, as they move through the water they deflect the flow, which exerts a force on the foil. If that force is upward, the faster they move, the greater the lift.

In addition, the pumping of hydrofoils may be seen when observing hydrofoil surfers, who gain propulsion by "pumping" the hydrofoil board. This is done, in the case of a fixed hydrofoil attached below a surfboard, by changing weight forward and then back, driving the foil first down and then up by changing its angle of attack. This pumping delivers forward thrust due to the hydrodynamics of the system. Similarly, there is an opportunity to gain forward thrust on boats by pumping hydrofoils, as discussed below.

Figure 24:
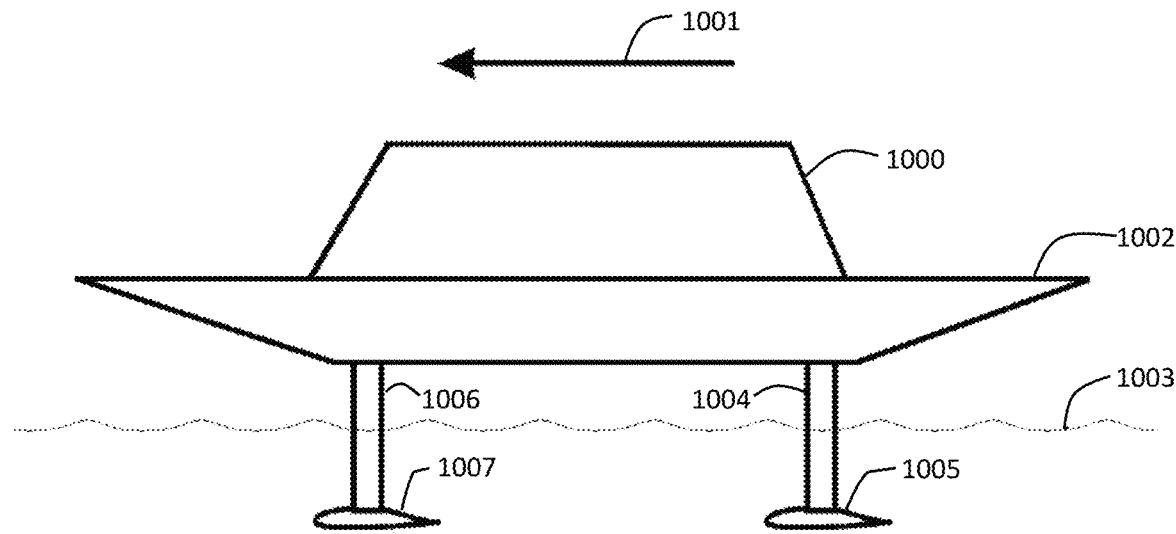
FIG. 24 is sketch of a boat with forward and aft hydrofoils.

FIG. 24 illustrates a hydrofoil boat 1000 with a hull 1002 traveling in a forward direction 1001. The hull 1102 of the boat 1000 is raised above the surface 1003 of the water, as occurs with forward speed coupled to the lift of hydrofoils. A front strut 1006 or struts supports a front hydrofoil 1007 while a rear strut 1004 or struts supports a rear hydrofoil 1005. In some aspects, the boat 1000 may be driven by a propeller which is located in the area of the rear hydrofoil 1005. In this illustrative embodiment, the hull 1002 is raised above the water surface 1003 due to the lift of the hydrofoils 1005, 1007.

Figure 25:
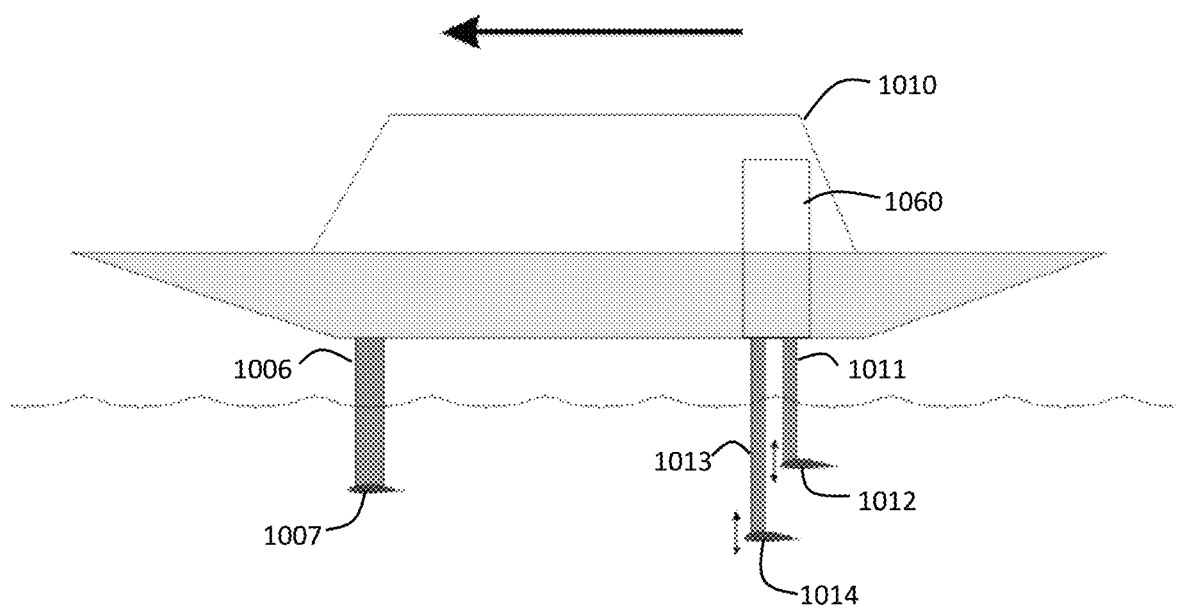
FIG. 25 is a sketch of a boat with a dual rear pumping hydrofoils according to some embodiments of the present invention.

In some embodiments of the present invention, as seen in FIG. 25, a hydrofoil boat 1010 is seen with double pumping rear hydrofoils. A front strut 1006 or struts supports a front hydrofoil 1007, as seen in the regular structure 1000 above. The boat 1010 has two rear hydrofoils which are adapted to pump up and down, and in doing so provide forward propulsion for the boat. A forward rear foil 1014 is coupled to the boat 1010 by a forward rear strut 1013. An aft rear foil 1012 is coupled to the boat 1010 by an aft rear strut 1011. A drive unit 1060 is adapted to pump the forward rear foil 1014 and the aft rear foil 1012 up and down. In some aspects, the drive unit 1060 is a linked linear drive system as discussed above. In some aspects, the upper of the two foils (the rear foil 1012 in this illustrative example) will remain above the full travel range of the lower foil (the front foil 1014 in this illustrative example) at all points in its travel range. This may provide a more undisturbed fluid flow for each foil.

Figure 26:
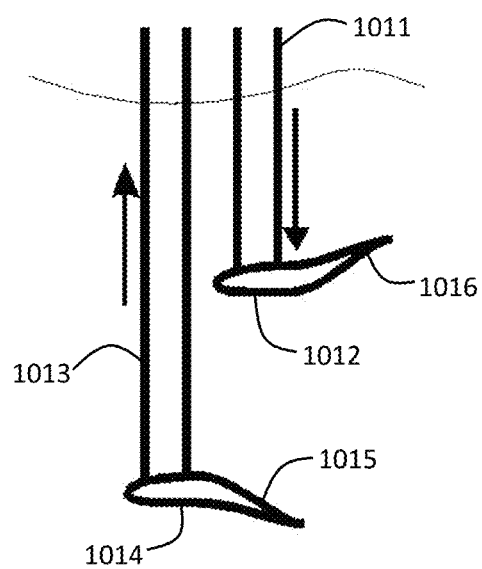
FIG. 26 is a sketch illustrating dual rear hydrofoil pumping with flexing foils according to some embodiments of the present invention.
Figure 27:
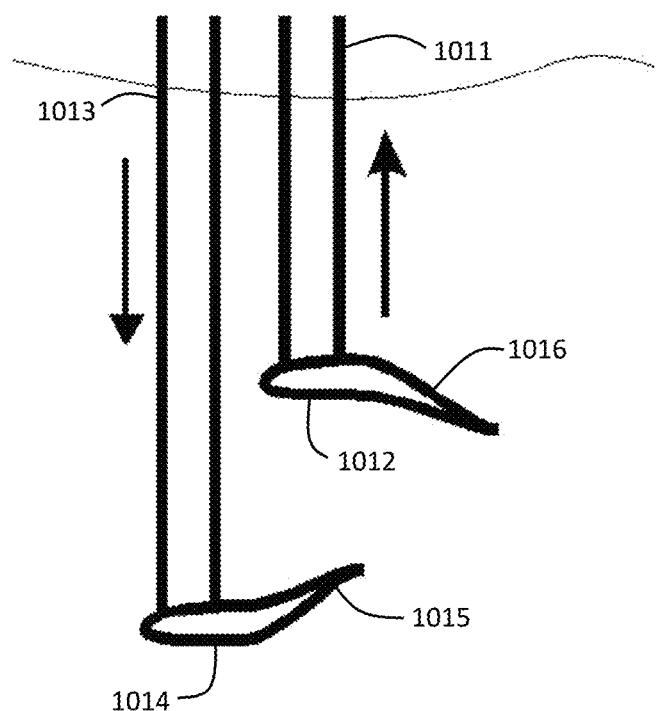
FIG. 27 is a sketch illustrating dual rear hydrofoil pumping with flexing foils according to some embodiments of the present invention.

In some embodiments of the present invention, as seen in FIGS. 26 and 27, double pumping airfoils 1012, 1014 with flexible blades 1015, 1016 coupled to struts 1011, 1013. The struts 1011, 1013 are adapted to be driven up and down, and may be up and down in a reciprocating alternating fashion, in that the front strut 1013 goes upward while the rear strut 1011 goes downward, as seen in FIG. 26, and vice versa, as seen in FIG. 27. The pumping of the struts 1011, 1013 results in the flexing of the flexible blades 1015, 1016 which then in turn provides forward propulsion of the boat. In some aspects, the hydrofoil boat 1010 is adapted to be propelled as a hydrofoil boat with the hull out of the water, and with the front foil and the dual pumping rear hydrofoils in the water and providing lift to keep the hull out of the water. Additionally, some or all of the forward propulsion of the hydrofoil boat derives from the propulsion resulting from the rearward flow along the flexed flexible blades 1015, 1016. In some aspects, the upper of the two foils (the rear foil 1012 in this illustrative example) will remain above the full travel range of the lower foil (the front foil 1014 in this illustrative example) at all points in its travel range. This may provide a more undisturbed fluid flow for each foil.

Figure 28:
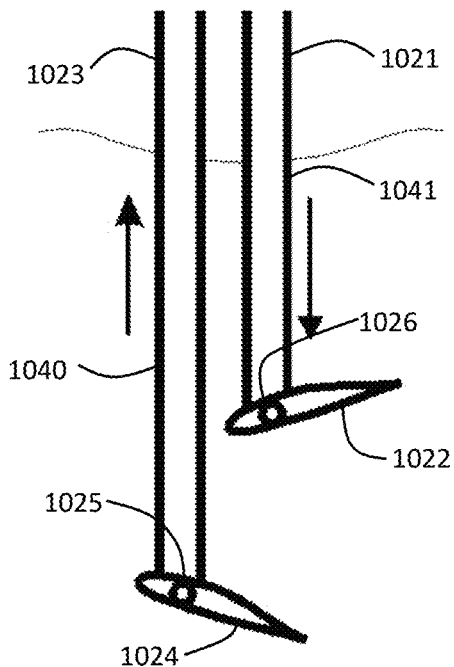
FIG. 28 is a sketch illustrating dual rear hydrofoil pumping with pivoting foils according to some embodiments of the present invention.
Figure 29:
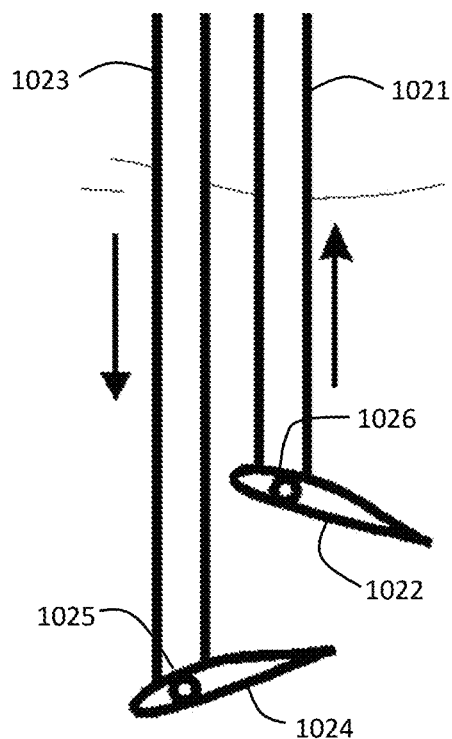
FIG. 29 is a sketch illustrating dual rear hydrofoil pumping with pivoting foils according to some embodiments of the present invention.

In some embodiments of the present invention, as seen in FIGS. 28 and 29, double pumping airfoils 1040, 1041 with pivoting blades 1022, 1024 coupled to struts 1021, 1023. The struts 1021, 1023 are adapted to be driven up and down, and may be up and down in a reciprocating alternating fashion, in that the front strut 1023 goes upward while the rear strut 1021 goes downward, as seen in FIG. 28, and vice versa, as seen in FIG. 29. The pumping of the struts 1021, 1023 results in the pivoting of the blades 1022, 1024 which then in turn provides forward propulsion of the boat. In some aspects, the hydrofoil boat 1010 is adapted to be propelled as a hydrofoil boat with the hull out of the water, and with the front foil and the dual pumping rear hydrofoils in the water and providing lift to keep the hull out of the water. Additionally, some or all of the forward propulsion of the hydrofoil boat derives from the propulsion resulting from the rearward flow along the pivoted flexible blades 1022, 1024. In some aspects, blades may pivot in the range of +/−5 degrees. In some aspects, blades may pivot in the range of +/−10 degrees. In some aspects, blades may pivot in the range of +/−15 degrees.

Figure 30:
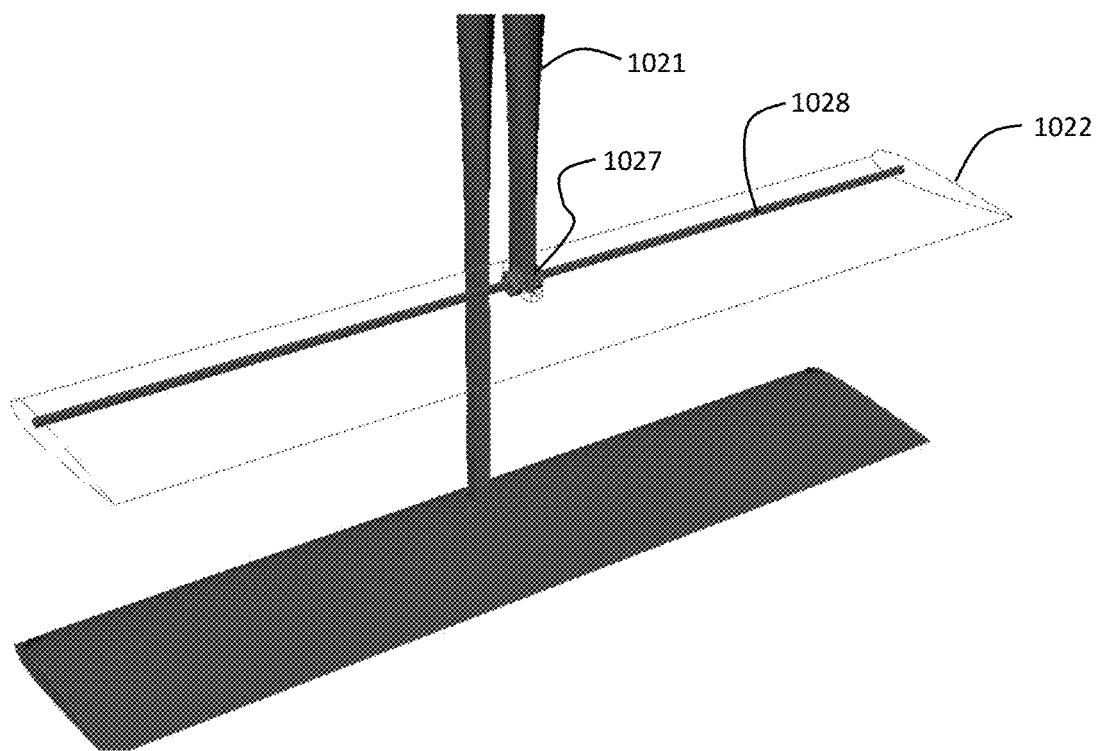
FIG. 30 is a sketch illustrating a rear hydrofoil with pivoting foils according to some embodiments of the present invention.

In some embodiments of the present invention, as seen in FIG. 30, a pivoting blade 1022 contains a structural element 1028 which extends outward from the strut 1021 out towards the ends of the blade 1022. The blade 1022 is coupled to the strut 1021 with a pivoting mechanism 1027 which allows for the pivoting of the blade. The pivoting mechanism 1027 may include mechanical stops adapted to constrain the pivoting of the blade at desired limits. In some aspects, blades may pivot in the range of +/−5 degrees. In some aspects, blades may pivot in the range of +/−10 degrees. In some aspects, blades may pivot in the range of +/−15 degrees.

Figure 31:
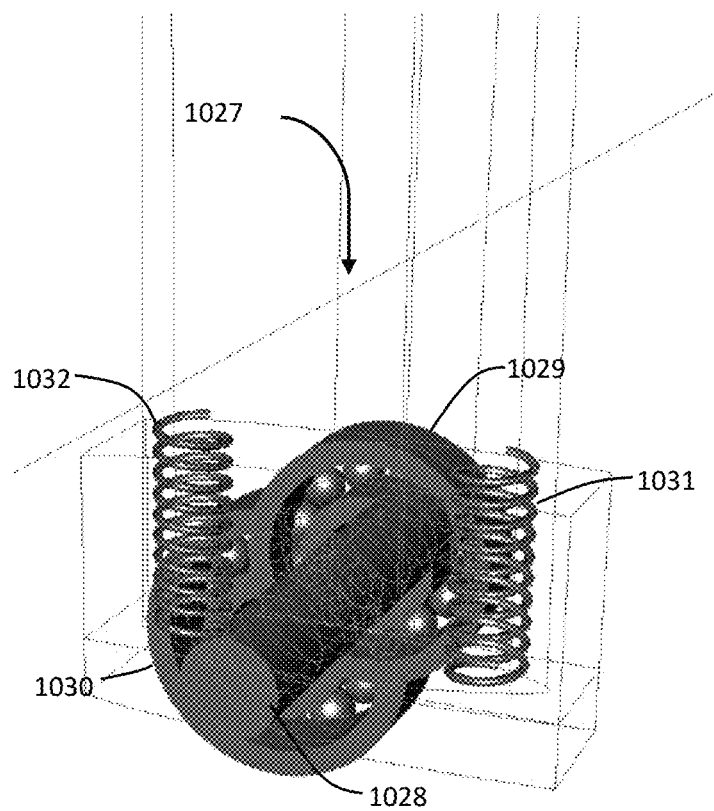
FIG. 31 is a sketch illustrating a foil pivot with springs according to some embodiments of the present invention.

FIG. 31 illustrates a pivoting mechanism 1027 which supports the structural element 1028 within a pivoting blade. Bearings 1029, 1030 rotatably support the structural element 1028 within the hydrofoil. Compression springs 1031, 1032 are adapted to help restore the blade to its neutral position from a deflected position.

Figure 32:
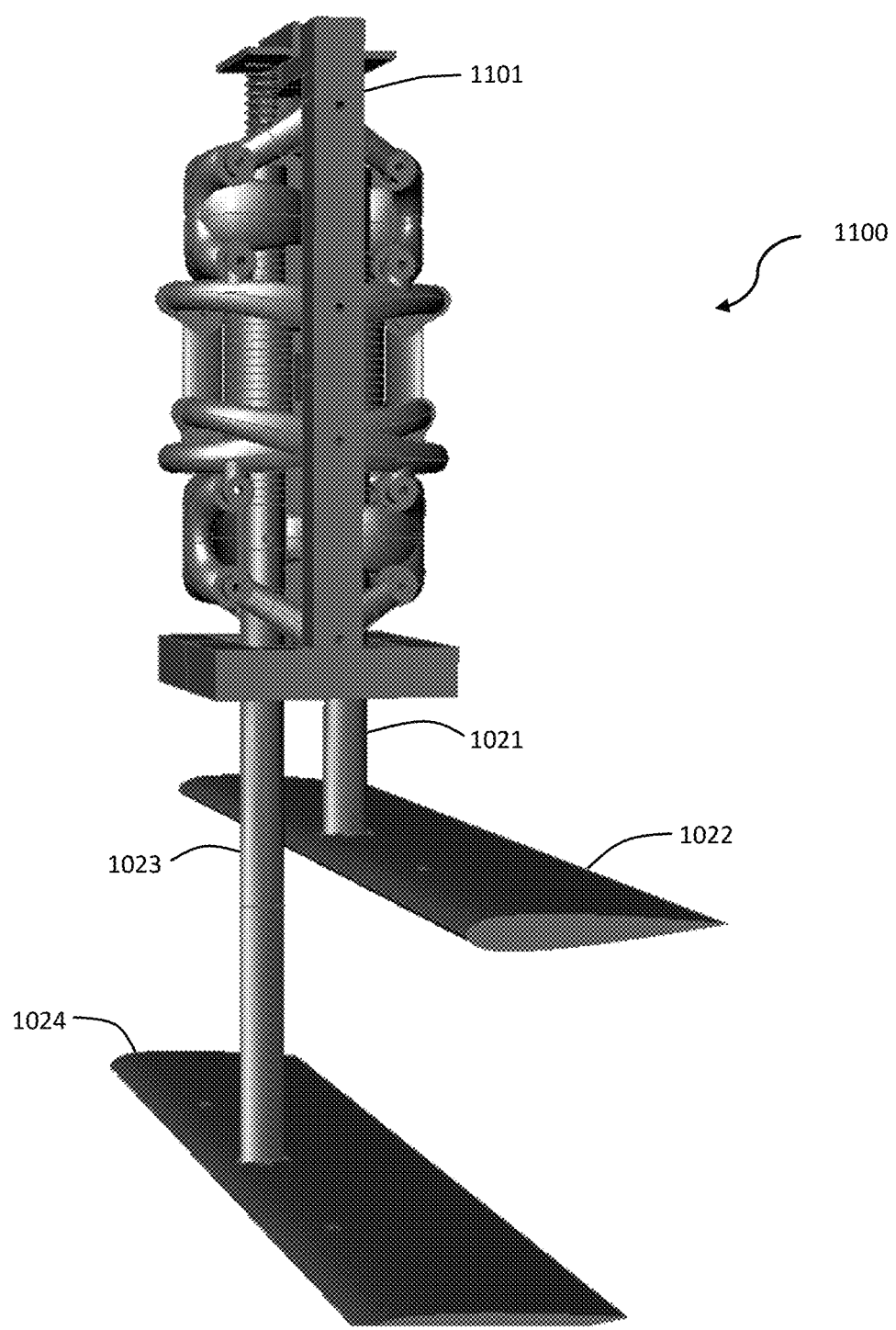
FIG. 32 is a view of a linearly driven linkage based dual hydrofoil system according to some embodiments of the present invention.

In some embodiments of the present invention, as seen in FIG. 32, a drive system 1100 utilizes a compact linked dual drive system 1101 powering struts 1021, 1023 which results in the pivoting of the flexible blades 1022, 1024, which then in turn provides forward propulsion of the boat. In some aspects, the hydrofoil boat 1010 is adapted to be propelled as a hydrofoil boat with the hull out of the water, and with the front foil and the dual pumping rear hydrofoils in the water and providing lift to keep the hull out of the water. Additionally, some or all of the forward propulsion of the hydrofoil boat derives from the propulsion resulting from the rearward flow along the pivoted flexible blades 1022, 1024.

Figure 33:
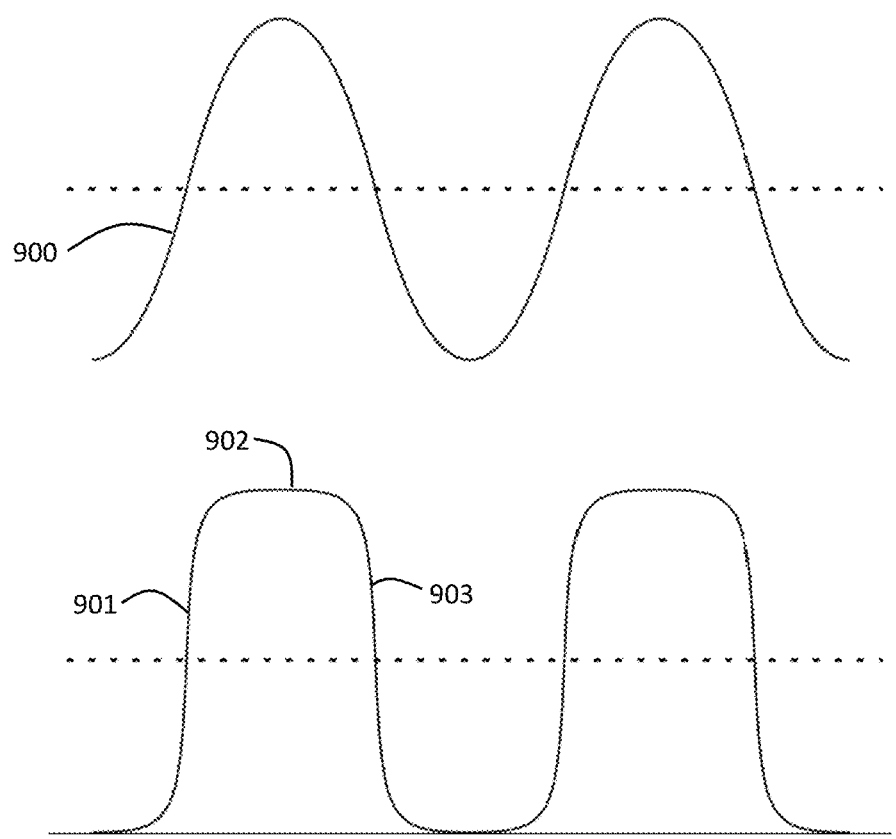
FIG. 33 are curves illustrating aspects of the speed regime according to some embodiments of the present invention.

As seen in FIG. 32, the powering struts 1021, 1023 may be physical extensions of drive rods of the linear drive motors of the linked dual drive system as discussed above. In some aspects, it may be desirable to drive the powering struts at a high speed along the length of their drive range. FIG. 33 illustrates a standard sine wave 900 which may represent the reciprocal speed of a drive blade of a dual bladed hydrofoil system. In contrast, the lower curve illustrates a more desirable time vs. speed curve for hydrofoil drive blades. The quick position changes 901, 903 with a flatter top 902 and bottom portions represent a drive system wherein the blades will move quickly when they are indeed moving up and down, with higher accelerations of the struts and hydrofoils.

In order to control the height of the boat above the water, or to raise the boat from the water, a variety of approaches may be used individually or in combination. Changing of the speed and/or power of the pumping double hydrofoils will affect this height of the boat above the water. Also, changing the angle of attack of the front hydrofoil will affect this height of the boat above the water. Also, changing the angle of attack of the rear dual pumping hydrofoil blades, which may be implemented with the fore/aft pivoting of the entire drive unit.

Figure 34:
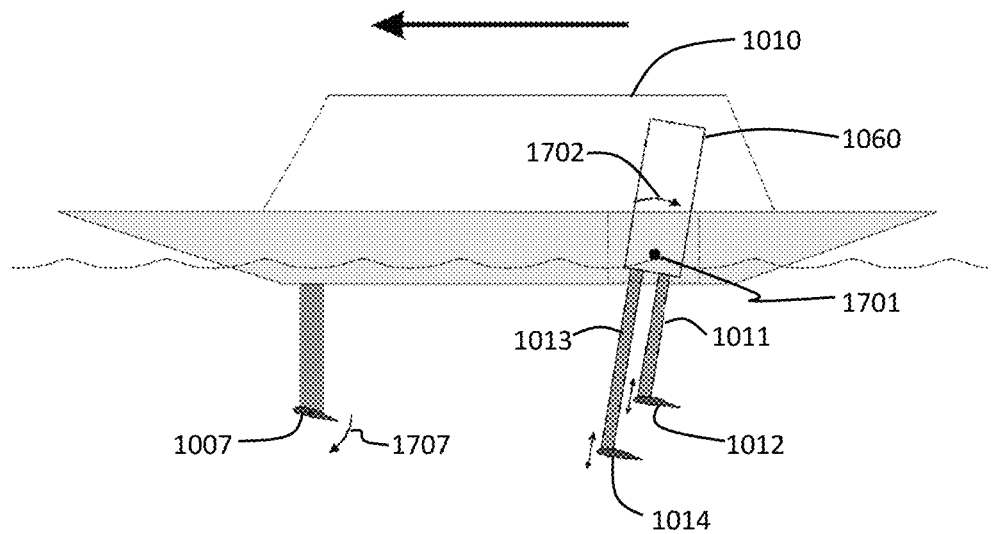
FIG. 34 is a view of a propulsion system with a tilting mechanism according to some embodiments of the present invention.

In some embodiments of the present invention, as seen in FIG. 34, a hydrofoil boat 1010 is seen with double pumping rear hydrofoils wherein the entire drive assembly 1060 and the struts 1011, 1013 and blades 1012, 1014 are adapted to rotate 1702 around a pivot 1701 in order to change the centered blade angle. The pivoting of the entire assembly allows for the entire drive system to maintain its rigidity and alignment while simultaneously allowing the blades to be tilted from a neutral position. In some aspects, as the hydrofoil boat with double pumping rear hydrofoils begins to gain speed the blade angles may be tilted upwards 1702, as seen in FIG. 34, to raise the boat up using the lift of the hydrofoils. This may assist in the raising of the boat from a more traditional in-the-water configuration to a hydrofoil riding configuration. In some aspects, once the boat is lifted out of the water the blade angles may be re-established into a more neutral position. In some aspects, the front foil 1107 is adapted to similarly pivot 1707 to assist in the lifting of the boat. In some aspects, the front foil may include actuation mechanisms or other means to implement the pivoting.

Figure 35A:
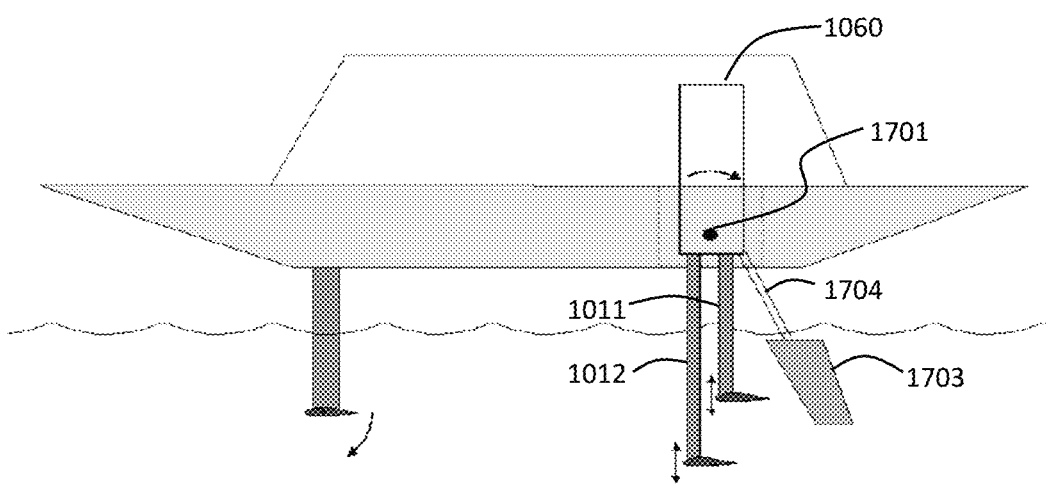
FIGS. 35A-B are views of an articulated propulsion system according to some embodiments of the present invention.
Figure 35B:
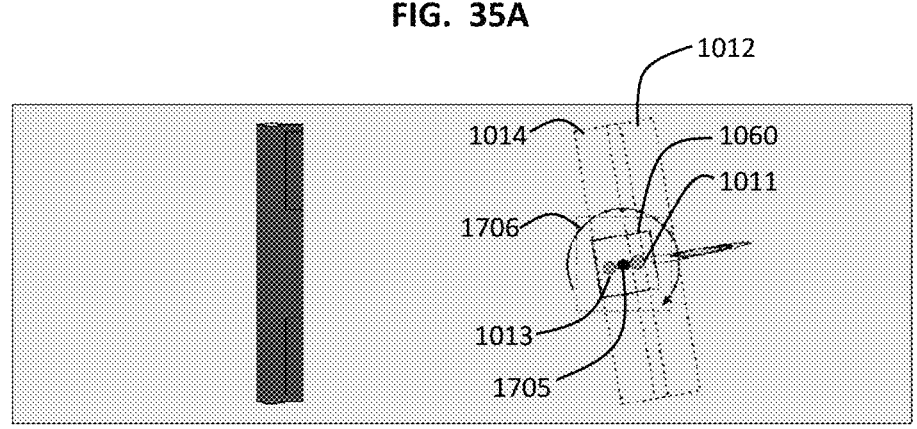

In some embodiments of the present invention, as seen in FIGS. 35A-B, a hydrofoil boat 1010 is seen with double pumping rear hydrofoils wherein the entire drive assembly 1060 and the struts 1011, 1013 and blades 1012, 1014 are adapted to rotate 1706 around a vertical axis 1705 in order to change the blade thrust direction, in order to turn the boat. The rotation of the entire assembly allows for the entire drive system to maintain its rigidity and alignment while simultaneously allowing the blades to be turned from a straight and forward orientation. In some aspects, the boat 1010 also utilizes a rudder 1703 wherein the shaft 1704 of the rudder is coupled to the rotating drive unit 1060. In some aspects, a rudder coupled to the boat 1010 and not the rotatable drive unit is used. In some aspects, once the boat has completed a turn the rotation of the drive unit and struts and blades may be re-established into a more neutral position. In some aspects, the rotation of the entire drive assembly including struts and blades may utilized for reverse thrust, in that the entire drive assembly may be rotated 180 degrees.

FIGS. 36A-E illustrate a pivoting hydrofoil blade system according to some embodiments of the present invention. In this exemplary embodiment, the struts 1121a, 1121b with their hydrofoil blades 1122a, 1122b may be coupled to or continuous from drive rods as described above. A strut 1121a may be removeably but fixedly coupled to the structural element 1128 of the blade 1122a. The entire blade assembly may be adapted to be fixedly coupled to the structural element with a cap which may be inserted and attached from the underside of the blade assembly, for example. The blade 1122*a* is adapted to rotate around the structural assembly 1128. The rotation of the blade may be resisted with springs 1141 which rotationally couple the blade to the structural element. A cover 1142 in the upper blade surface may allow access to a recess 1143 which allows for access to, and installation or removal of, various components.

Figure 36A:
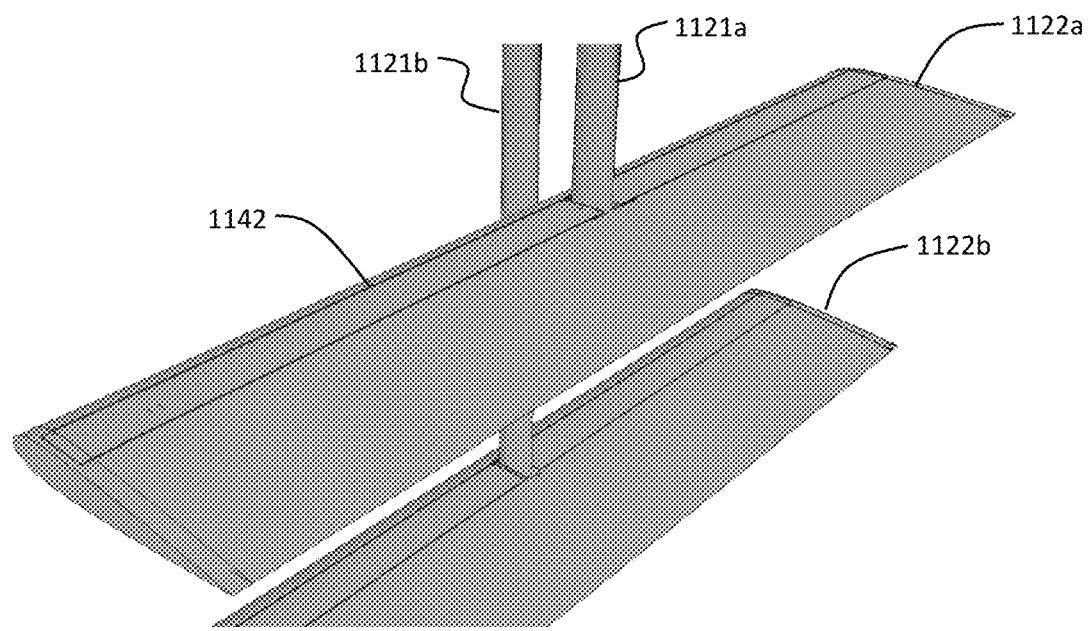
FIGS. 36A-E are views of a pivoting hydrofoil blade according to some embodiments of the present invention.
Figure 36B:
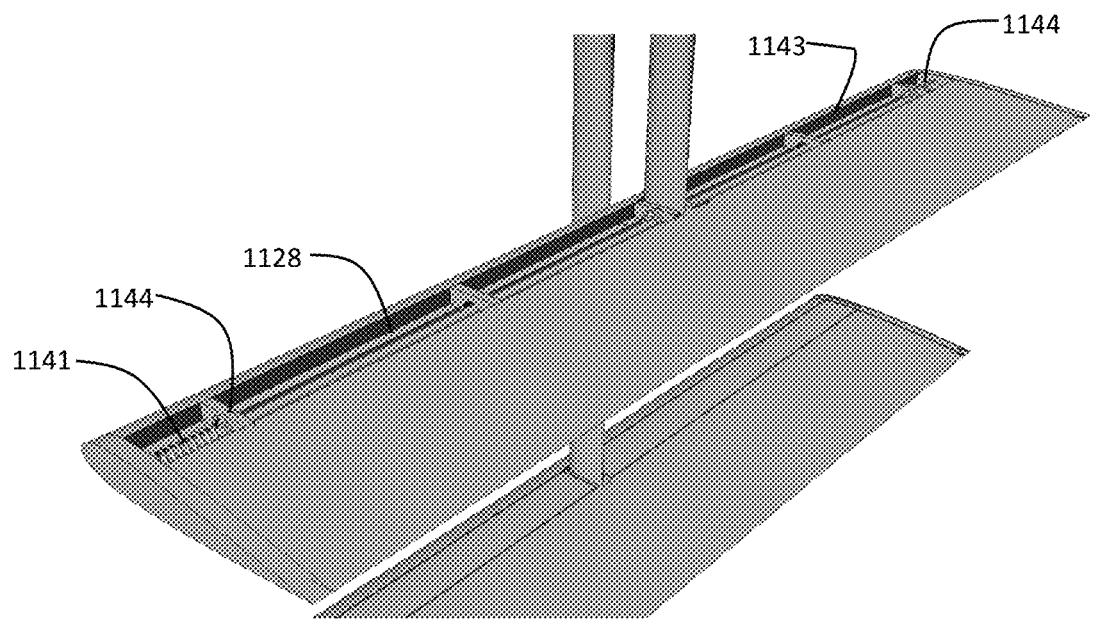
Figure 36C:
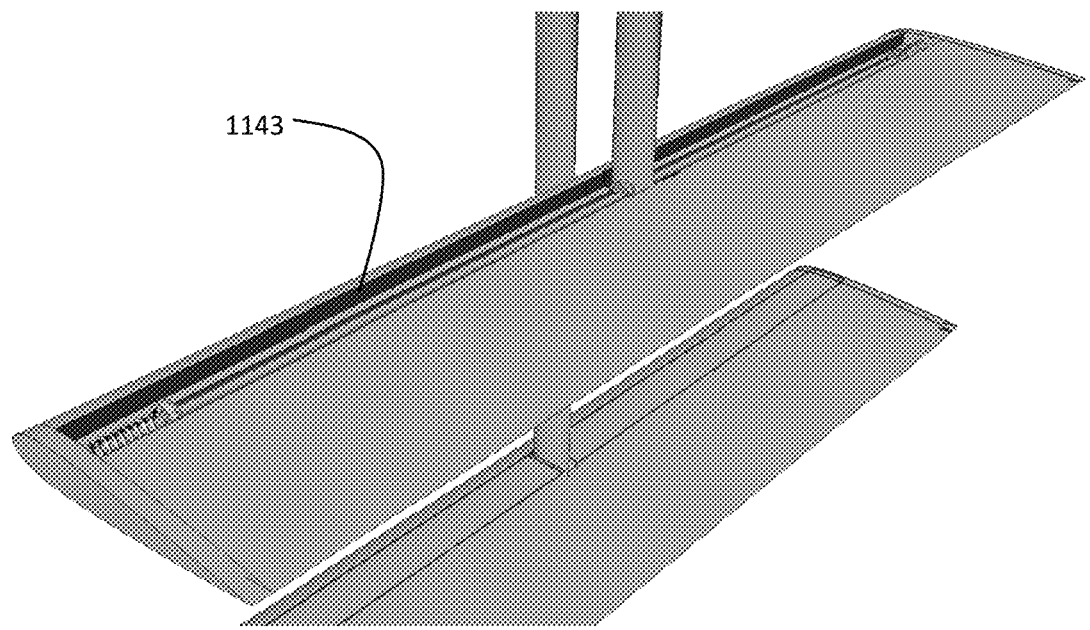
Figure 36D:
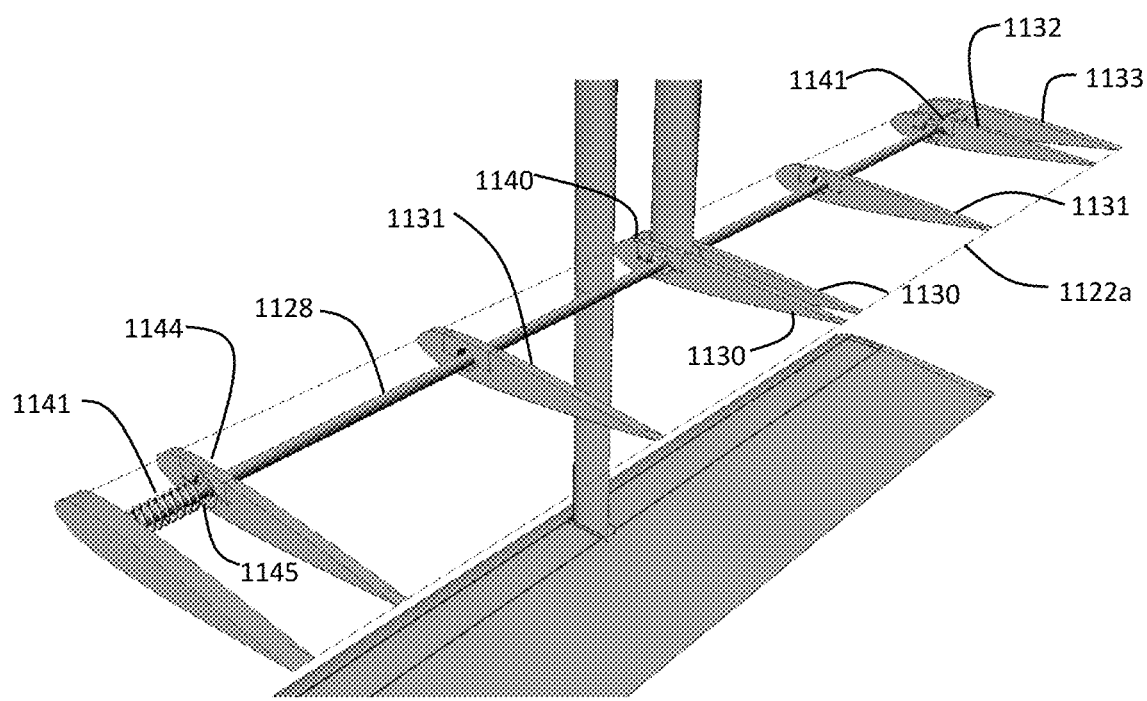
Figure 36E:
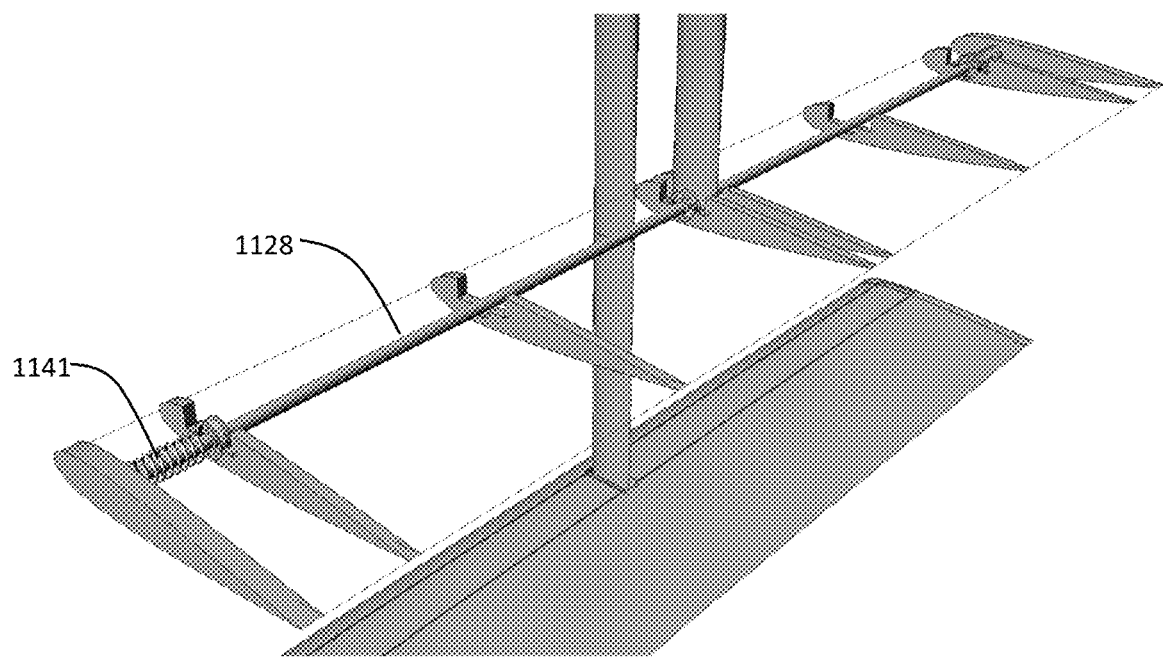

FIG. 36D illustrates a see through view of the blade 1122*a* wherein stiffening elements 1133, 1132, 1131, 1130 are used longitudinally to provide strength and stiffness to the blade. The stiffeners may have removable caps 1144 which allow the rod to be inserted into the blade via the recess 1143 with the cover removed. Bearings may be present at the center stiffening elements 1130 and the end stiffening elements 1132, and other elements. The torsion springs 1141 are adapted to provide torsional resistance coupling between the structural element 1128 and the blade 1122*a*. As the structural element is fixedly coupled to the strut 1121*a*, the torsion springs allow for rotation of the blade along the axis of the structural element during loading of the blade. In an exemplary embodiment, there may also be mechanical stops which limit the rotation of the blade relative to the structural element 1128. For example, the mechanical stops may limit the axial rotation to +/−15 degrees. The springs, however, are sized to limit that rotation to a lower range during expected operation loading. For example, the torsion springs may limit the rotation of the blade to +/−5 degrees during normal operation expected maximum loads.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A boat with a dual pumping hydrofoil system, said boat comprising:
    a hull;
    a front strut coupled to a front area of said hull;
    a front hydrofoil coupled to said front strut;
    a forward rear strut;
    a forward rear hydrofoil coupled to said forward rear strut;
    a first drive system coupled to said forward rear strut;
    a rearward rear strut;
    a rearward rear hydrofoil coupled to said rearward rear strut; and
    a second drive system coupled to said rearward rear strut.

2. The boat of claim 1 wherein said forward rear hydrofoil is pivotally coupled to said forward rear strut, and wherein said rearward rear hydrofoil is pivotally coupled to said rearward rear strut.

3. The boat of claim 1 wherein said forward rear hydrofoil is adapted to pivot under pressure, and wherein said rearward rear hydrofoil is adapted to pivot under pressure.

4. The boat of claim 2 further comprising
    a base structure, said base structure coupled to said hull; and
    wherein said first drive system comprises:
        a first linkage subassembly, said first linkage subassembly coupled to said forward rear strut, said first linkage subassembly comprising:
            a first base link pivotally coupled to said base structure at a first end of said first base link;
            a second base link pivotally coupled to said base structure at a first end of said base link;
            a first joining link pivotally coupled to a second end of said first base link at a first end of said first joining link and pivotally coupled to a second end of said second base link at a second end of said joining link;
            a first rod link pivotally coupled to said first end of said joining link at a first end and pivotally coupled to a first pivot of a first drive rod on a second end; and
            a second rod link pivotally coupled to said second end of said joining link a first end and pivotally coupled to a first pivot of said first drive rod on a second end; and
        a second linkage subassembly, said second linkage subassembly coupled to said rearward rear strut, said first linkage subassembly comprising:
            a third base link pivotally coupled to said base structure at a first end of said third base link;
            a fourth base link pivotally coupled to said base structure at a first end of said fourth base link;
            a second joining link pivotally coupled to a second end of said third base link at a first end of said second joining link and pivotally coupled to a second end of said fourth base link at a second end of said second joining link;
            a third rod link pivotally coupled to said first end of said second joining link at a first end and pivotally coupled to a second pivot of said first drive rod on a second end; and
            a fourth rod link pivotally coupled to said second end of said second joining link at a first end and pivotally coupled to said second pivot of said first drive rod on a second end.

5. The boat of claim 4 wherein said first linear drive system further comprises a first linear drive motor, said first linear drive motor comprising:
    an inner portion coupled to said first drive rod; and
    an outer portion coupled to said base structure.

6. The boat dual of claim 5:
    wherein said second drive system comprises:
        a third linkage subassembly, said third linkage subassembly comprising:
            a fifth base link pivotally coupled to said base structure at a first end of said fifth base link;
            a sixth base link pivotally coupled to said base structure at a first end of said sixth base link;
            a third joining link pivotally coupled to a second end of said fifth base link at a first end of said third joining link and pivotally coupled to a second end of said sixth base link at a second end of said third joining link;
            a fifth rod link pivotally coupled to said first end of said third joining link at a first end and pivotally coupled to a first pivot of a second drive rod on a second end; and
            a sixth rod link pivotally coupled to said second end of said third joining link at a first end and pivotally coupled to the first pivot of the second drive rod on a second end; and
        a fourth linkage subassembly, said fourth linkage subassembly comprising:
            a seventh base link pivotally coupled to said base structure at a first end of said seventh base link;

an eighth base link pivotally coupled to said base structure at a first end of said base link;

a fourth joining link pivotally coupled to a second end of said seventh base link at a first end of said fourth joining link and pivotally coupled to a second end of said eighth base link at a second end of said fourth joining link;

a seventh rod link pivotally coupled to said first end of said fourth joining link at a first end and pivotally coupled to a second pivot of said second drive rod on a second end; and an eighth rod link pivotally coupled to said second end of said fourth joining link at a first end and pivotally coupled to said second pivot of said second drive rod on a second end.

7. The boat of claim 6 further comprising a second linear drive motor, said second linear drive motor comprising:

an inner portion coupled to said second drive rod; and an outer portion coupled to said base structure.

8. The dual linear drive system of claim 7 further comprising a linkage structure coupling said first linkage subassembly to said second linkage subassembly, wherein motion of said first drive rod results in motion in a reverse direction of said second drive rod.

9. The boat of claim 2 further comprising a drive system, said drive system comprising:

a first drive motor coupled to said forward rear strut; and a second drive motor coupled to said rearward rear strut.

10. The boat of claim 2 wherein said drive system and said forward rear strut and said rearward rear strut are able to pivot fore and aft around a horizontal pivot, thereby changing the angles of attack of said forward rear hydrofoil and said rearward rear hydrofoil.

11. The boat of claim 2 wherein said drive system and said forward rear strut and said rearward rear strut are able to pivot fore and aft around a pivot axis parallel to a long axis of said forward rear strut and said rearward rear strut.

12. The boat of claim 10 wherein said drive system and said forward rear strut and said rearward rear strut are able to pivot fore and aft around a pivot axis parallel to a long axis of said forward rear strut and said rearward rear strut.

13. The boat of claim 7 wherein said drive system and said forward rear strut and said rearward rear strut are able to pivot fore and aft around a horizontal pivot, thereby changing the angles of attack of said forward rear hydrofoil and said rearward rear hydrofoil.

14. The boat of claim 7 wherein said drive system and said forward rear strut and said rearward rear strut are able to pivot fore and aft around a pivot axis parallel to a long axis of said forward rear strut and said rearward rear strut.

15. The boat of claim 13 wherein said drive system and said forward rear strut and said rearward rear strut are able to pivot fore and aft around a pivot axis parallel to a long axis of said forward rear strut and said rearward rear strut.

\* \* \* \* \*